United States Patent
Sasai

(10) Patent No.: US 9,565,583 B2
(45) Date of Patent: Feb. 7, 2017

(54) MONITORING DEVICE AND MONITORING SYSTEM

(71) Applicant: FUJITSU LIMITED, Kawasaki-shi, Kanagawa (JP)

(72) Inventor: Hiroyuki Sasai, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 14/686,215

(22) Filed: Apr. 14, 2015

(65) Prior Publication Data

US 2015/0350935 A1 Dec. 3, 2015

(30) Foreign Application Priority Data

May 29, 2014 (JP) .................. 2014-111603

(51) Int. Cl.
| | | |
|---|---|---|
| *H04W 24/00* | (2009.01) | |
| *H04W 24/04* | (2009.01) | |
| *H04L 12/26* | (2006.01) | |
| *H04L 12/24* | (2006.01) | |

(52) U.S. Cl.
CPC .......... *H04W 24/04* (2013.01); *H04L 41/0677* (2013.01); *H04L 41/0806* (2013.01); *H04L 43/04* (2013.01); *H04L 43/065* (2013.01); *H04L 43/0817* (2013.01); *H04L 43/10* (2013.01)

(58) Field of Classification Search
CPC ............. H04L 43/0817; H04L 41/0677; H04L 41/0686; H04L 41/0806; H04L 43/04; H04L 43/065; H04L 43/10; H04W 24/04

USPC .................................. 455/423–424
See application file for complete search history.

(56) References Cited

U.S. PATENT DOCUMENTS

| | | | | |
|---|---|---|---|---|
| 5,923,247 A * | 7/1999 | Dowden | ............. | H04L 41/0681 340/500 |
| 7,177,282 B1 * | 2/2007 | Gilbert | .................. | H04L 43/045 370/230.1 |
| 7,562,134 B1 * | 7/2009 | Fingerhut | ............... | H04L 43/06 370/230 |
| 8,041,350 B2 * | 10/2011 | Inagaki | ................ | H04J 11/0093 455/422.1 |
| 8,320,260 B2 * | 11/2012 | Westerberg | ........... | H04W 24/02 370/242 |
| 2006/0007858 A1 * | 1/2006 | Fingerhut | ............... | H04L 41/12 370/229 |
| 2006/0050649 A1 * | 3/2006 | Botton-Dascal | .... | H04L 12/2697 370/252 |

(Continued)

FOREIGN PATENT DOCUMENTS

| | | |
|---|---|---|
| JP | 2004-145781 | 5/2004 |
| JP | 2007-114907 | 5/2007 |

(Continued)

*Primary Examiner* — Charles Shedrick
(74) *Attorney, Agent, or Firm* — Fujitsu Patent Center

(57) ABSTRACT

A monitoring device includes a transmitting unit, a receiving unit, and a determining unit. The transmitting unit transmits, to a plurality of base stations, instructions on mutual monitoring among the base stations. The receiving unit receives, from a base station that has detected abnormality of a base station serving as a monitoring target in accordance with the instruction among the base stations, information indicating a base station determined as having abnormality. The determining unit determines a level of a fault that has occurred in the base station indicated by the information received by the receiving unit.

4 Claims, 22 Drawing Sheets

(56) References Cited

U.S. PATENT DOCUMENTS

2008/0186872 A1\* 8/2008 Zaencker ................ H04L 1/205
                                                    370/252
2009/0052333 A1\* 2/2009 Vankov .................. H04L 43/50
                                                    370/242

FOREIGN PATENT DOCUMENTS

| JP | 2009-231861 | 10/2009 |
|----|-------------|---------|
| JP | 2011-66522  | 3/2011  |
| JP | 2013-26794  | 2/2013  |

\* cited by examiner

FIG.2

| FEMTO BASE STATION | MONITORING TARGET FEMTO BASE STATION | | | | | | | |
|---|---|---|---|---|---|---|---|---|
| F1 | F2 | F3 | F4 | F5 | F6 | | F99 | F100 |
| F2 | F3 | F4 | F5 | F6 | F7 | | F100 | F1 |
| F3 | F4 | F5 | F6 | F7 | F8 | | F1 | F2 |
| F4 | F5 | F6 | F7 | F8 | F9 | | F2 | F3 |
| F5 | F6 | F7 | F8 | F9 | F10 | | F3 | F4 |
| F6 | F7 | F8 | F9 | F10 | F11 | ... | F4 | F5 |
| F7 | F8 | F9 | F10 | F11 | F12 | | F5 | F6 |
| F8 | F9 | F10 | F11 | F12 | F13 | | F6 | F7 |
| F9 | F10 | F11 | F12 | F13 | F14 | | F7 | F8 |
| F10 | F11 | F12 | F13 | F14 | F15 | | F8 | F9 |
| F11 | F12 | F13 | F14 | F15 | F16 | | F9 | F10 |
| F12 | F13 | F14 | F15 | F16 | F17 | | F10 | F11 |
| ⋮ | ⋮ | | | | | ⋮ | ⋮ | |
| F98 | F99 | F100 | F1 | F2 | F3 | | F96 | F97 |
| F99 | F100 | F1 | F2 | F3 | F4 | ... | F97 | F98 |
| F100 | F1 | F2 | F3 | F4 | F5 | | F98 | F99 |

L1

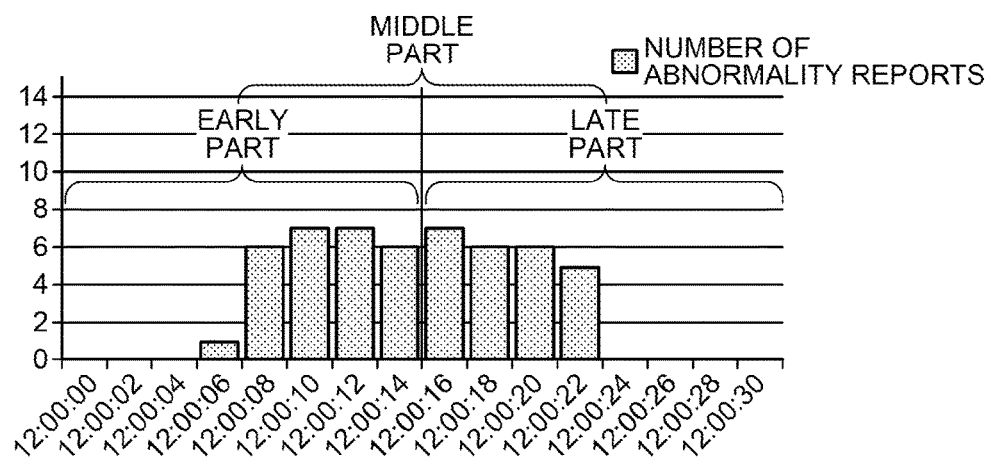

FIG.21
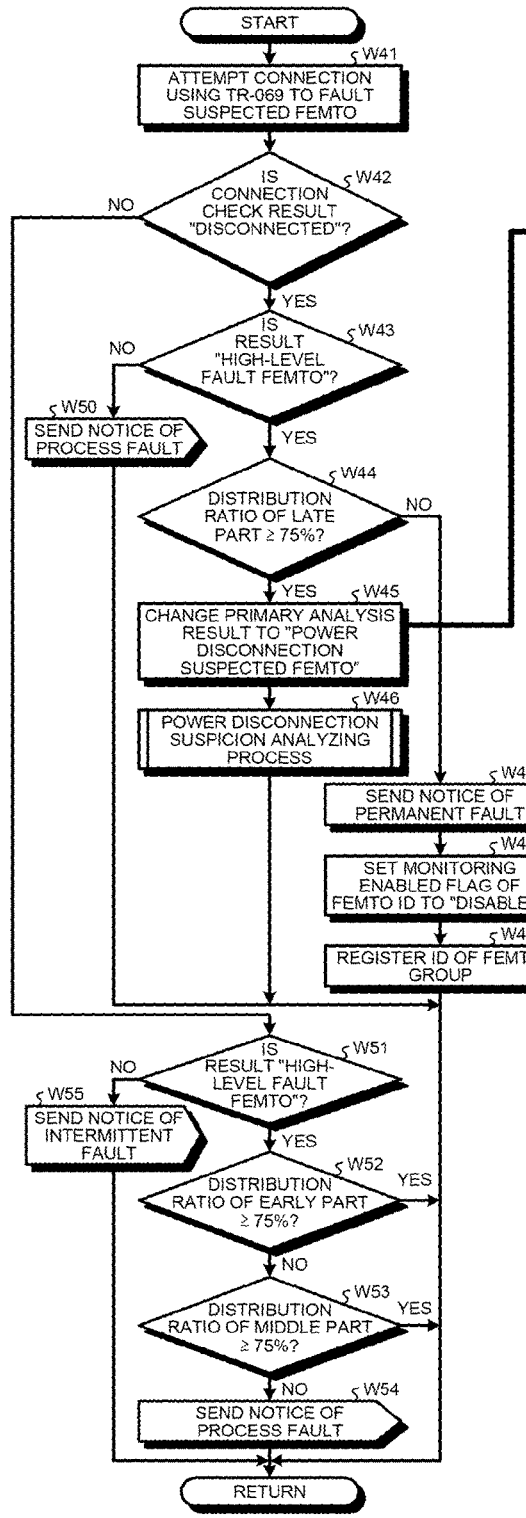
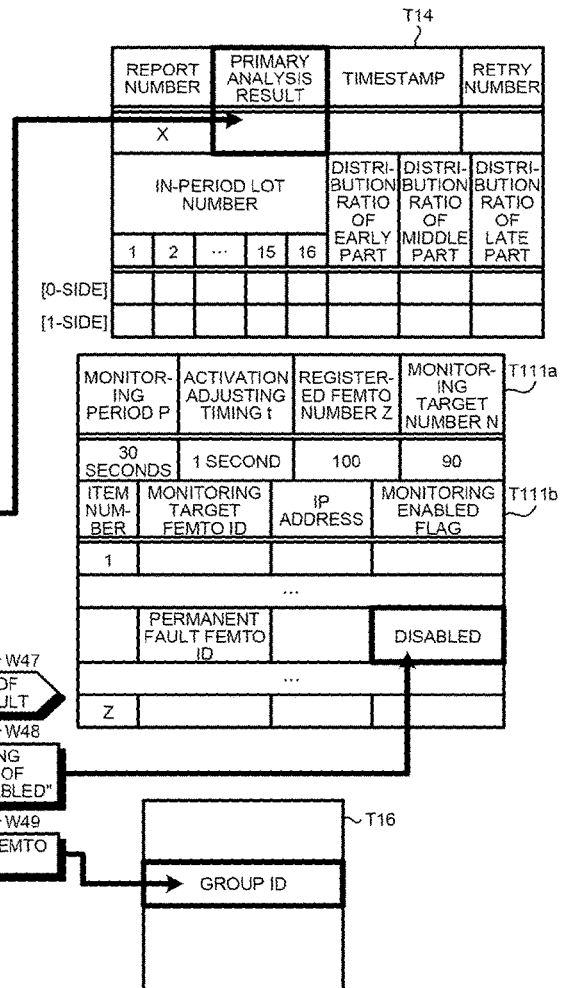

MONITORING DEVICE AND MONITORING SYSTEM

CROSS-REFERENCE TO RELATED APPLICATION

This application is based upon and claims the benefit of priority of the prior Japanese Patent Application No. 2014-111603, filed on May 29, 2014, the entire contents of which are incorporated herein by reference.

FIELD

The embodiment discussed herein is related to a monitoring device and a monitoring system.

BACKGROUND

In recent years, with the sophistication of wireless communication due to the popularization of new technologies including long term evolution (LTE), smaller cells are increasingly widespread in order to reduce network load. In particular, a femto base station that forms a femtocell that is a hundred-thousandth of a macrocell is rapidly increasing; however, because the femto base station has similar functions as those of a macro base station, the equivalent maintenance and management as those of the macro base station are needed. However, the number of installed femto base stations is much larger than the macro base stations; therefore, in the femto base stations, an Internet-based interface (for example, technical report (TR)-069) rather than a dedicated line is employed in order to suppress maintenance and management cost. Specifically, in a network formed by femtocells, a monitoring device, such as an equipment management system (EMS), monitors under-controlled femto base stations in real time via the above described interface.

Patent Document 1: Japanese Laid-open Patent Publication No. 2013-26794
Patent Document 2: Japanese Laid-open Patent Publication No. 2004-145781
Patent Document 3: Japanese Laid-open Patent Publication No. 2009-231861
Patent Document 4: Japanese Laid-open Patent Publication No. 2007-114907
Patent Document 5: Japanese Laid-open Patent Publication No. 2011-66522

However, because the number of the femto base stations to be monitored is large, large load is constantly applied to the monitoring device regardless of occurrence or non-occurrence of faults in the femto base stations. Specifically, the monitoring device needs about one second for a connection sequence and a disconnection sequence in order to monitor a single femto base station. Therefore, if 100,000 femto base stations are to be monitored with a period of 30 seconds for example, the monitoring device needs to have the capability to simultaneously monitor 3,000 or more femto base stations. Further, the monitoring device performs monitoring by checking connections to the femto base stations. Therefore, it is difficult to determine whether the monitoring target femto base stations are in fault states or in power disconnected states, or it is difficult to determine whether a fault is an intermittent fault or a permanent fault.

SUMMARY

According to an aspect of the embodiments, a monitoring device includes: a transmitting unit that transmits, to a plurality of base stations, instructions on mutual monitoring among the base stations; a receiving unit that receives, from a base station that has detected abnormality of a base station serving as a monitoring target in accordance with the instruction among the base stations, information indicating a base station determined as having abnormality; and a determining unit that determines a level of a fault that has occurred in the base station indicated by the information received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a configuration example of a monitoring femto matrix list;

FIG. 9A is a diagram for explaining a method of analyzing a histogram;

FIG. 9B is a diagram illustrating a distribution ratio of abnormality report messages for each of an early part, a middle part, and a late part;

FIG. 21 is a flowchart for explaining a secondary analysis process performed by the EMS;

DESCRIPTION OF EMBODIMENTS

Preferred embodiments will be explained with reference to accompanying drawings. The monitoring device and the monitoring system disclosed in the present application are not limited to the embodiments below.

Figure 1:
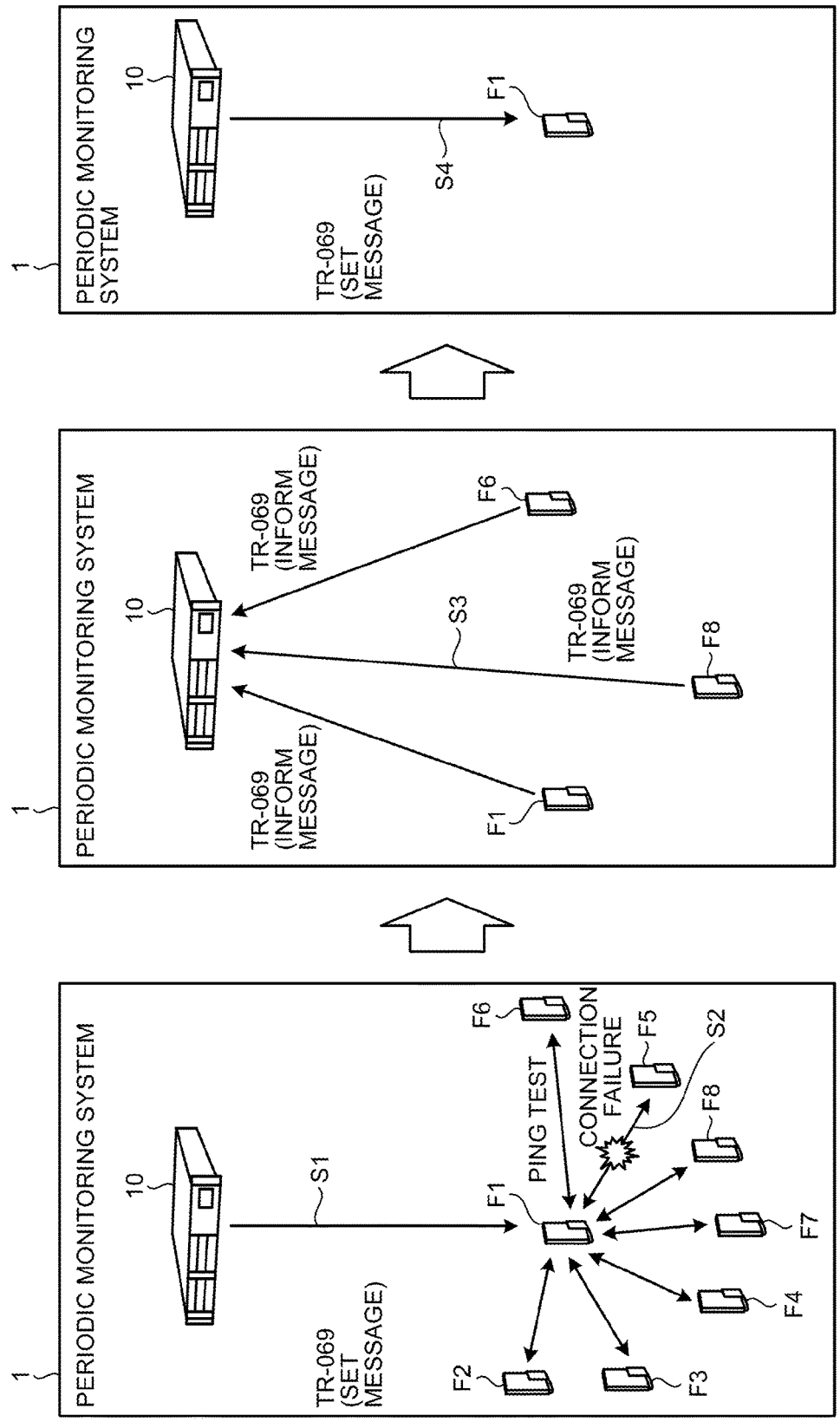
FIG. 1 is a conceptual diagram for explaining a method of monitoring femto base stations.

FIG. 1 is a conceptual diagram for explaining a method of monitoring femto base stations. As illustrated in FIG. 1, a periodic monitoring system 1 includes an EMS 10 and a plurality of femto base stations F1 to F8. The EMS 10 transmits a periodic femto monitoring instruction to all of the femto base stations F1 to F8 beforehand by TR-069 protocol (S1). The periodic femto monitoring instruction includes a monitoring femto matrix list and a monitoring period (for example, 30 seconds) to be described later. For example, the femto base station F1, upon receiving the periodic femto monitoring instruction, starts monitoring with the monitoring period. For example, the femto base station F1 that has started monitoring with the monitoring period checks ping connections to the other femto base stations F2 to F8, which are registered in the monitoring femto matrix list, with the monitoring period. If a connection failure occurs (S2), the femto base station F1 gives a report to the EMS 10. In the other femto base stations F2 to F8, the same connection checking process and the same reporting process are performed.

For example, the femto base station F8, when detecting a connection failure of the femto base station F5, transmits an abnormality report message to the EMS 10 by the TR-069 protocol (S3). The abnormality report message contains an ID and an internet protocol (IP) address of the femto base station in which the connection failure has occurred. The EMS 10 captures the abnormality report messages from the controlled femto base stations F1 to F8 with a predetermined period (for example, 30 seconds), and analyzes a fault of the femto base station (hereinafter, referred to as a "femto fault") as a source of the reported connection failure. The EMS 10 determines whether the femto fault is of a low level (for example, an intermittent fault) or is of a high level (for example, a permanent fault) based on a result of the analysis.

The predetermined period of the EMS 10 is not limited to be synchronized and may be synchronized with the monitoring period of each of the femto base stations F1 to F8 (not started simultaneously). Further, if the predetermined period and the monitoring period are set to the same time interval (period), the number of reports that the EMS 10 receives from a single femto base station within the predetermined period is limited to one. Therefore, load on the EMS 10 due to the capturing and the analysis process is reduced.

The EMS 10, when determining that the reported femto fault is of a high level or is a power disconnection, generates a new monitoring femto matrix list in which the fault femto base station is deleted, and distributes the monitoring femto matrix list to all of the femto base stations to be monitored (S4). For example, the femto base station F1 continues monitoring with the monitoring period in accordance with a retransmitted new periodic femto monitoring instruction.

Next, the monitoring femto matrix list contained in the periodic femto monitoring instruction will be described. FIG. 2 is a diagram illustrating a configuration example of a monitoring femto matrix list L1. In FIG. 2, an example is illustrated in which a single femto base station monitors 99 femto base stations. As illustrated in FIG. 2, in the monitoring femto matrix list L1, the femto base stations to be monitored are registered such that they slightly differ for each of the femto base stations F1 to F100 that perform monitoring. The monitoring femto matrix list L1 need not necessarily store data as illustrated in FIG. 2; however, it is preferable to design the list such that all of the femto base stations F1 to F100 have equal monitoring load in the entire monitoring system from the point of view of ensuring the fairness of the monitoring load.

Each of the femto base stations F1 to F100 starts to monitor the other femto base stations with a period designated by the EMS 10, in accordance with the monitoring femto matrix list L1. For example, each of the femto base stations F1 to F100 performs a connection check, such as a ping test, on monitoring target femto base stations, which are associated with each of the femto base stations and registered in the monitoring femto matrix list L1. As a result of the check, only when detecting a connection failure, each of the femto base stations F1 to F100 gives a report on occurrence of the connection failure to the EMS 10 by the TR-069 protocol. The report contains an ID (for example, "F1" to "F100") for identifying a femto base station in which the connection failure has occurred.

The EMS 10 captures abnormality report messages from the controlled femto base stations F1 to F100 with a predetermined period. The EMS 10 analyzes a fault of the femto base station in which the connection failure has occurred, based on the abnormality report messages captured within the predetermined period, and determines the degree of the fault. As a result of the determination, if the degree of the fault is a high level (for example, a permanent fault) or a power disconnection, the EMS 10 regenerates a new monitoring femto matrix list L1 by deleting the femto base station in which the fault has occurred, and redistributes the monitoring femto matrix list L1 to all of the controlled monitoring target femto base stations.

Figure 3:
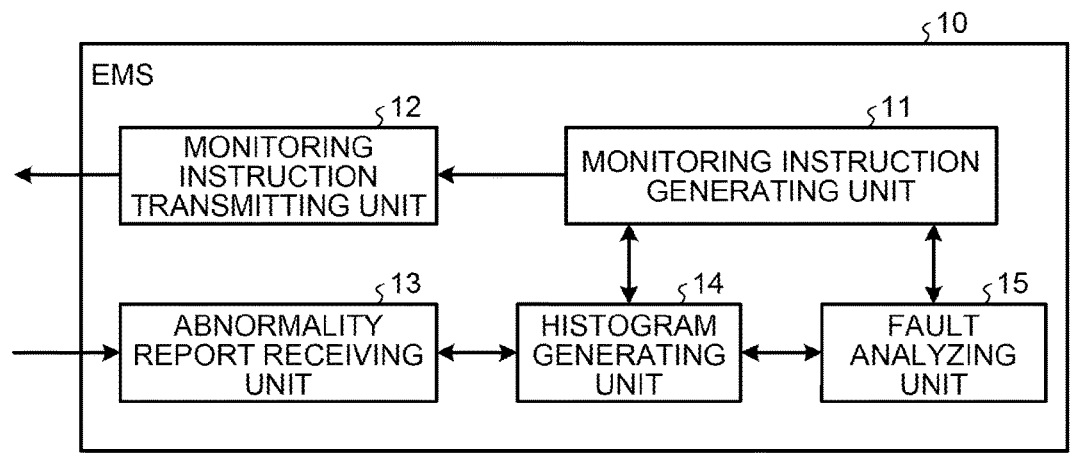
FIG. 3 is a diagram illustrating a functional configuration of an EMS according to an embodiment.

FIG. 3 is a diagram illustrating a functional configuration of the EMS 10 according to the embodiment. As illustrated in FIG. 3, the EMS 10 includes a monitoring instruction generating unit 11, a monitoring instruction transmitting unit 12, an abnormality report receiving unit 13, a histogram generating unit 14, and a fault analyzing unit 15. All of the components are connected to one another so as to be able to input and output signals and data unidirectionally or bidirectionally.

The monitoring instruction generating unit 11 generates periodic femto monitoring instructions for the femto base stations F1 to F100 at a predetermined activation adjusting timing. Further, the monitoring instruction generating unit 11 performs a monitoring instruction regenerating process to be described later. The monitoring instruction transmitting unit 12 transmits, to the femto base stations F1 to F100, instructions on mutual monitoring among the femto base stations F1 to F100. The abnormality report receiving unit 13 receives an abnormality report message indicating a femto base station determined as having abnormality, from a femto base station that has detected the abnormality in accordance with the above described instruction among the femto base stations F1 to F100. The histogram generating unit 14 performs a histogram generating process to be described later. The fault analyzing unit 15 determines a level of the fault that has occurred in the femto base station indicated by the abnormality report message. Further, the fault analyzing unit 15 performs a primary analysis process, a secondary analysis process, and a power disconnection suspicion analyzing process to be described later.

Figure 4:
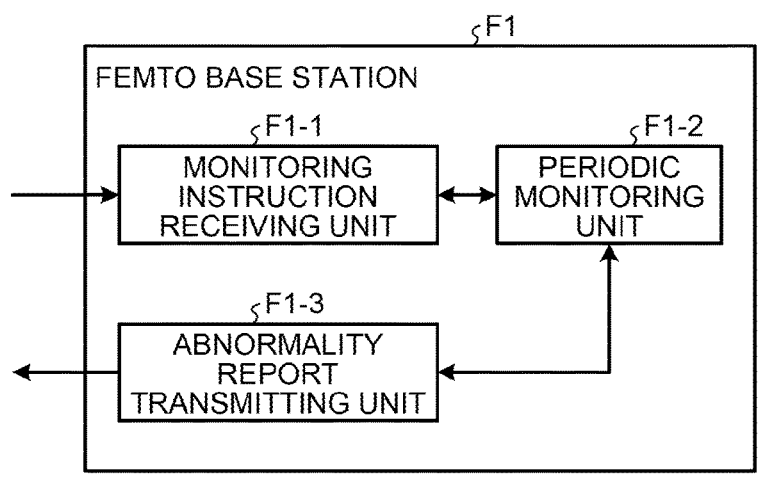
FIG. 4 is a diagram illustrating a functional configuration of a femto base station according to the embodiment.

FIG. 4 is a diagram illustrating a functional configuration of the femto base station F1 according to the embodiment. As illustrated in FIG. 4, the femto base station F1 includes a monitoring instruction receiving unit F1-1, a periodic monitoring unit F1-2, and an abnormality report transmitting unit F1-3. All of the components are connected to one another so as to be able to input and output signals and data unidirectionally or bidirectionally. The monitoring instruction receiving unit F1-1 receives the instruction on mutual monitoring transmitted by the EMS 10. The periodic monitoring unit F1-2 monitors the other femto base stations F2 to F100 in accordance with the instruction. The abnormality report transmitting unit F1-3, upon detecting abnormality in the other femto base station F8 as a result of the monitoring, transmits information indicating the femto base station F8 determined as having the abnormality to the EMS 10.

Figure 5:
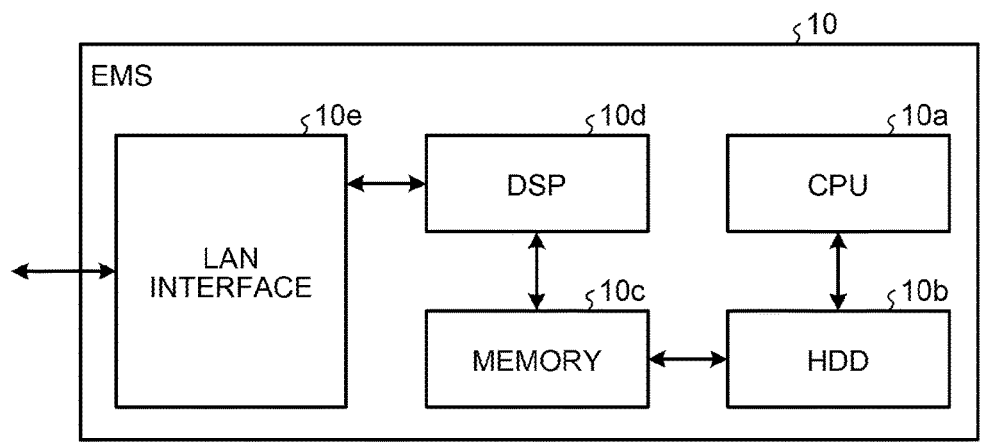
FIG. 5 is a diagram illustrating a hardware configuration of the EMS according to the embodiment.

Next, a hardware configuration will be described. FIG. 5 is a diagram illustrating a hardware configuration of the EMS 10 according to the embodiment. The EMS 10 is, for example, a server device. As illustrated in FIG. 5, the EMS 10 includes, as hardware components, a central processing unit (CPU) 10a, a hard disk drive (HDD) 10b, a memory 10c, a digital signal processor (DSP) 10d, and a local area network (LAN) interface 10e. The memory 10c is configured by a random access memory (RAM), such as a synchronous dynamic random access memory (SDRM), by a read only memory (ROM), or by a flash memory, for example.

Regarding a correspondence relationship between the functional configuration and the hardware configuration of the EMS 10, the monitoring instruction generating unit 11 is implemented by the DSP 10d and the memory 10c, for example. The monitoring instruction transmitting unit 12 and the abnormality report receiving unit 13 are implemented by the LAN interface 10e, for example. The histogram generating unit 14 and the fault analyzing unit 15 are implemented by the CPU 10a, the HDD 10b, and the memory 10c, for example.

Figure 6:
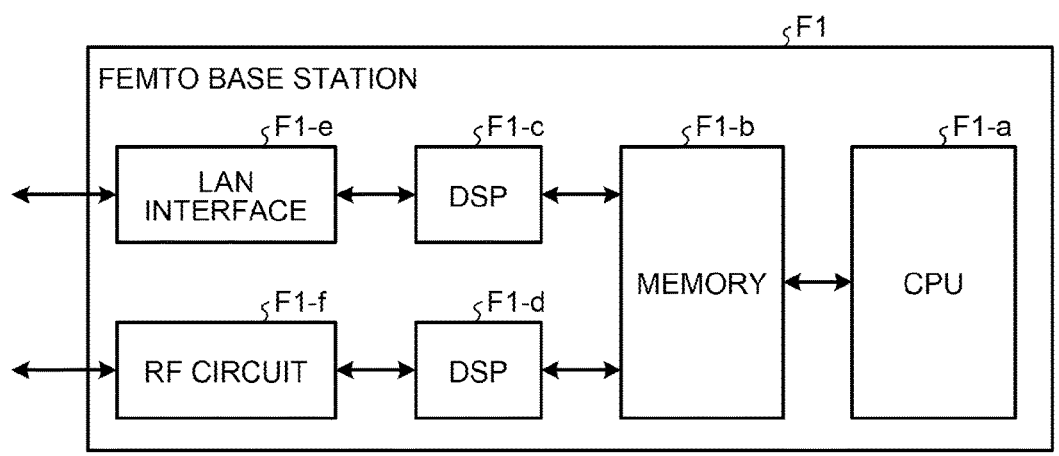
FIG. 6 is a diagram illustrating a hardware configuration of the femto base station according to the embodiment.

FIG. 6 is a diagram illustrating a hardware configuration of the femto base station F1 according to the embodiment. As illustrated in FIG. 6, the femto base station F1 includes, as hardware components, a CPU F1-a, a memory F1-b, a DSP F1-c for wired communication, a DSP F1-d for wireless communication, a LAN interface F1-e, and a radio frequency (RF) circuit F1-f. The memory F1-b is configured by a RAM, such as an SDRM, by a ROM, or by a flash memory, for example.

Regarding a correspondence relationship between the functional configuration and the hardware configuration of the femto base station F1, the monitoring instruction receiving unit F1-1 and the abnormality report transmitting unit F1-3 are implemented by the DSP F1-c for wired communication and the LAN interface F1-e, for example. The periodic monitoring unit F1-2 is implemented by the CPU F1-a and the memory F1-b, for example.

While the configuration of the femto base station F1 is described above in a representative manner, the configurations of the other femto base stations F2 to F100 are the same as the configuration of the femto base station F1. Therefore, the same components are denoted by reference symbols with the same ends, and illustration and detailed explanation thereof will be omitted.

Next, operation will be described.

Figure 7:
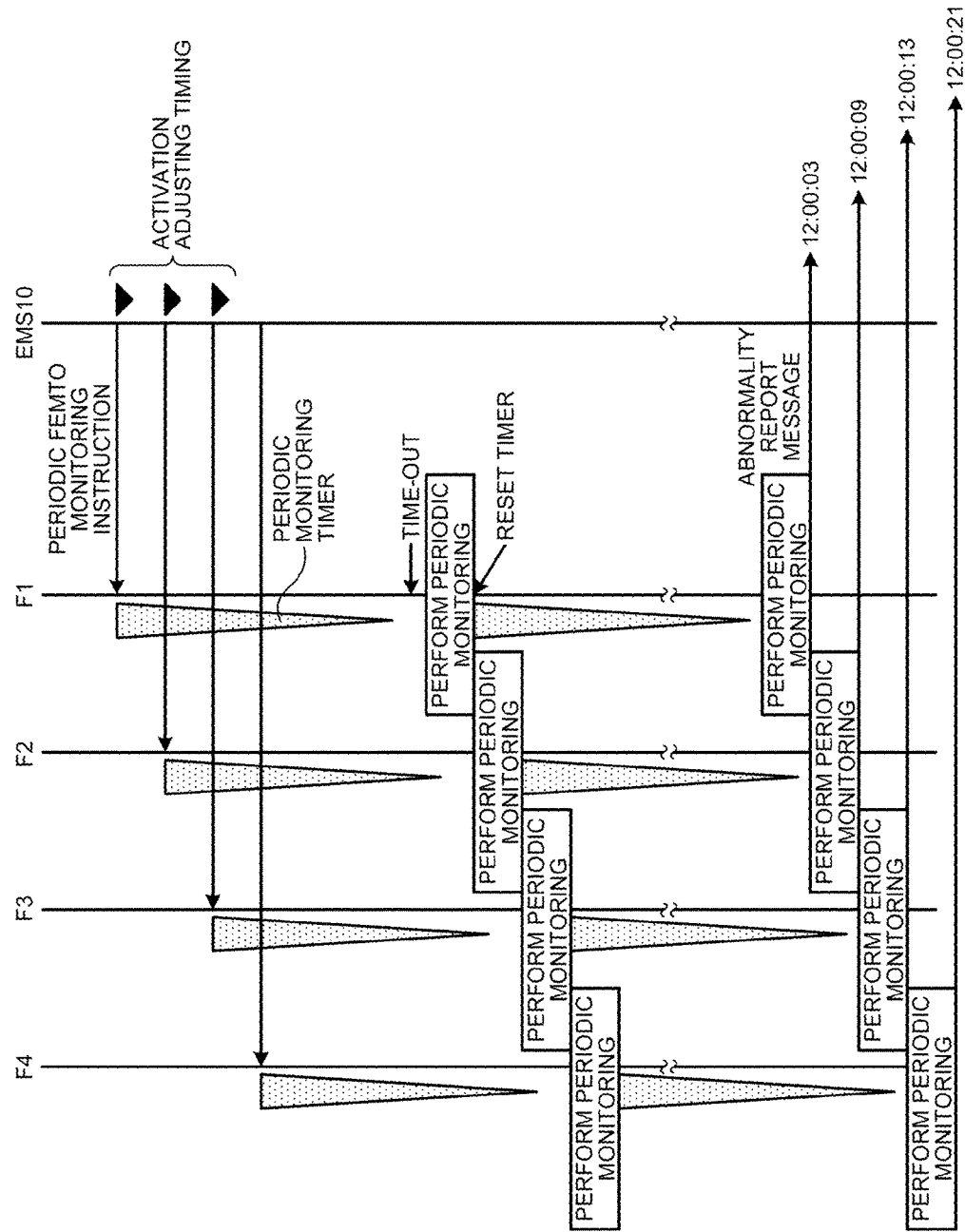
FIG. 7 is a diagram for explaining a periodic monitoring sequence by a duration timer.

First, with reference to FIG. 7 to FIG. 9B, a periodic monitoring sequence performed by the femto base stations F1 to F100 will be described. FIG. 7 is a diagram for explaining a periodic monitoring sequence by a duration timer. As illustrated in FIG. 7, each of the femto base stations F1 to F4, upon receiving the periodic femto monitoring instruction from the EMS 10 at the predetermined activation adjusting timing, activates a periodic monitoring timer. When the periodic monitoring timer has timed out, each of the femto base stations F1 to F4 resets the periodic monitoring timer, and executes the periodic monitoring sequence on a femto base station to be monitored next in accordance with the monitoring femto matrix list. As a result of the execution, when detecting abnormality, each of the femto base stations F1 to F4 reports the abnormality to the EMS 10 by the abnormality report message. While the femto base stations F1 to F4 are illustrated in a representative manner in FIG. 7, the other femto base stations F5 to F100 perform the same processes.

The periodic monitoring sequence by each of the femto base stations F5 to F100 is not executed in synchronization with time, but by the periodic monitoring timer serving as a duration timer. Therefore, the abnormality report messages evenly arrive within the predetermined period (for example, 30 seconds) of the EMS 10 that operates in synchronization with time. Further, the periodic femto monitoring instruction that serves as a trigger for each of the femto base stations F5 to F100 to start the periodic monitoring sequence is issued at the activation adjusting timing of the EMS 10, and therefor is evenly distributed within the predetermined period of the EMS 10.

If the periodic femto monitoring instruction is issued so as to be evenly distributed, a frequency distribution of arrival of the abnormality report messages within the predetermined period occurs in the EMS 10. For example, if the femto base stations receive, from the EMS 10, the periodic femto monitoring instructions to cause each of the femto base stations to monitor 100 femto base stations, each of the femto base stations are monitored by the 100 femto base stations.

Figure 8A:
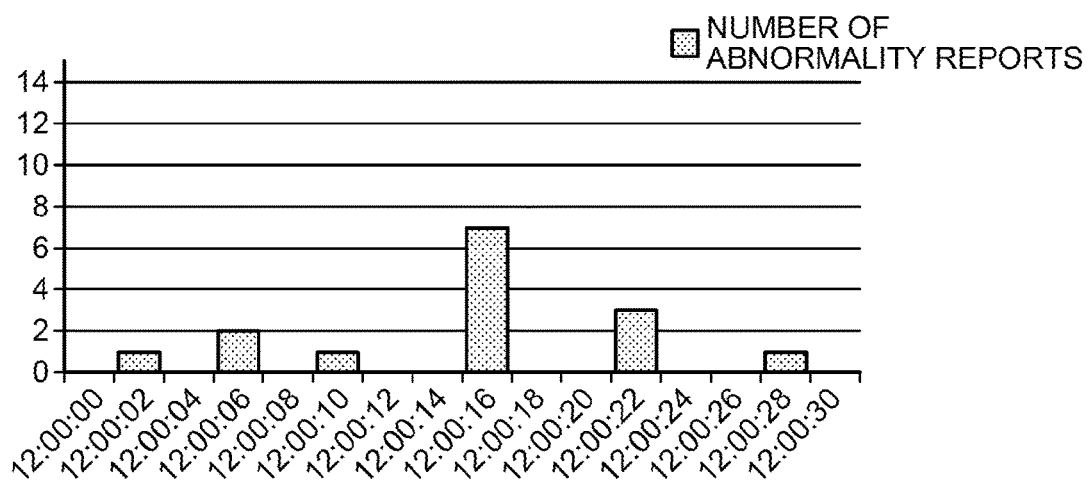
FIG. 8A is a diagram illustrating a distribution of abnormality report messages when a suspected fault is an intermittent fault.

FIG. 8A is a diagram illustrating a distribution of the abnormality report messages when a suspected fault is an intermittent fault. In FIG. 8A, the x-axis defines time and the y-axis defines the number of abnormality reports. In FIG. 8A, the abnormality report messages arrive at the EMS 10 in a distributed manner such that one message arrives at "12:00:02", two messages arrives at "12:00:06", and one message arrives at "12:00:10", for example. In this manner, when the abnormality report messages are issued in a distributed manner within the predetermined period and arrive at the EMS 10 in a distributed manner, the EMS 10 can determine that a femto base station with the ID contained in the abnormality report messages has an intermittent fault.

Figure 8B:
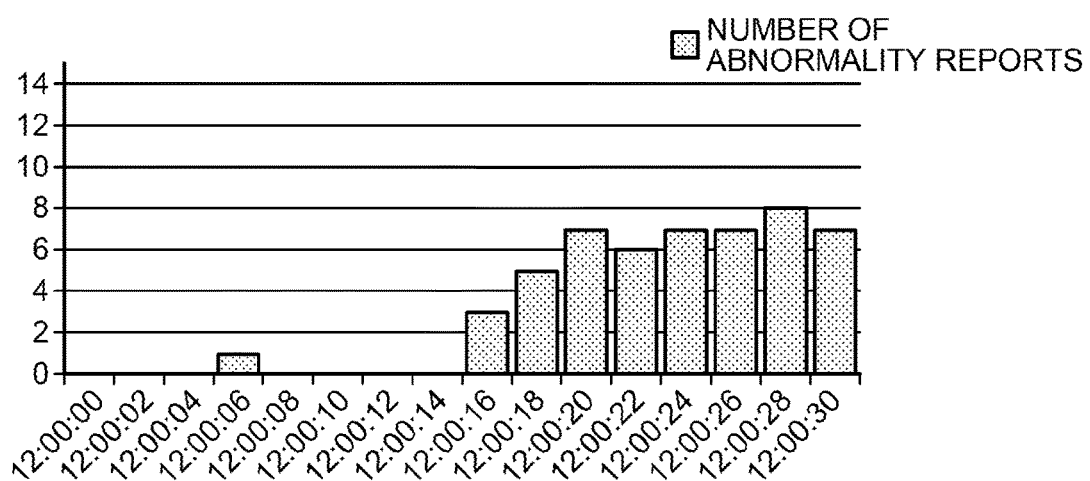
FIG. 8B is a diagram illustrating a distribution of abnormality report messages when a suspected fault is a permanent fault.

FIG. 8B is a diagram illustrating a distribution of the abnormality report messages when a suspected fault is a permanent fault. In FIG. 8B, the number of the abnormality report messages increases such that three messages arrive at "12:00:16", five messages arrive at "12:00:18", and seven messages arrive at "12:00:20", and thereafter, about seven messages are maintained until "12:00:30". In this manner, when arrival of the abnormality report messages is concentrated in a certain part of the predetermined period (a late part in FIG. 8B), the EMS 10 can determine that a femto base station with the ID contained in the abnormality report messages has a permanent fault or a power disconnection (including a disconnection of a cable or the like).

Figure 8C:
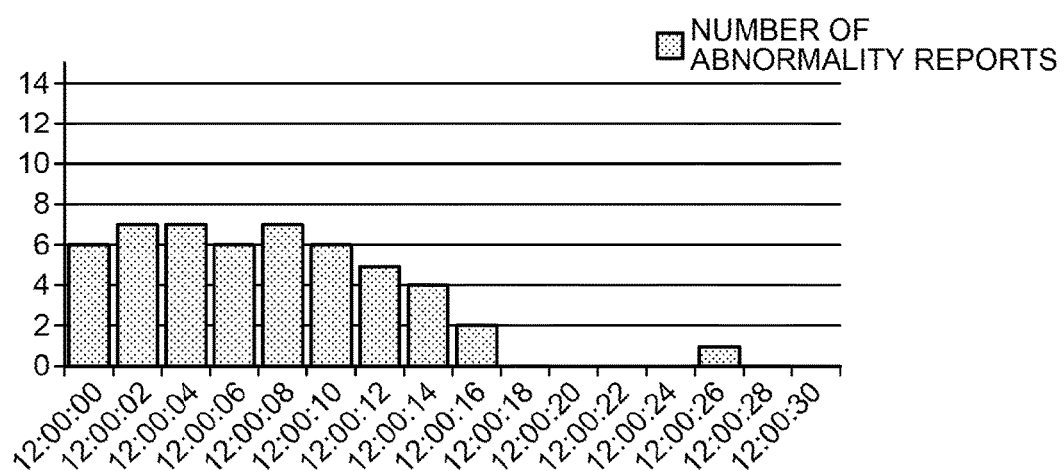
FIG. 8C is a diagram illustrating a distribution of abnormality report messages when a fault is automatically resolved.

FIG. 8C is a diagram illustrating a distribution of the abnormality report messages when a fault is automatically resolved. In FIG. 8C, the number of the abnormality report messages is maintained at about six from "12:00:00" to "12:00:10", and thereafter gradually decreases and is maintained at zero from "12:00:18". In this manner, when arrival of the abnormality report messages is concentrated in a certain part of the predetermined period (an early part in FIG. 8C) and thereafter stops, the EMS 10 can determine that a femto base station with the ID contained in the abnormality report messages has once had a fault but automatically recovered from the fault. Therefore, it becomes possible to estimate that the fault is not a fault of the femto base station itself, but a fault caused by an external network or the like, for example.

Figure 8D:
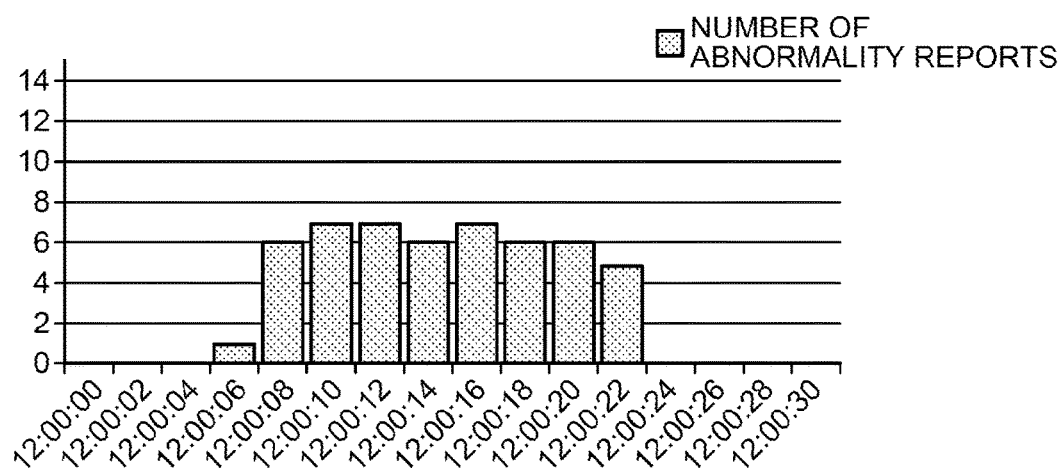
FIG. 8D is a diagram illustrating another distribution of abnormality report messages when a fault is automatically resolved.

Similarly, FIG. 8D is a diagram illustrating another distribution of the abnormality report messages when a fault is automatically resolved. In FIG. 8D, the number of the abnormality report messages greatly increases at "12:00:08", is maintained at about six from "12:00:10" to "12:00:22", and is maintained at zero from "12:00:24". In this manner, even when arrival of the abnormality report messages is concentrated in a middle part of the predetermined period and thereafter stops, the EMS 10 can determine that a femto base station with the ID contained in the abnormality report messages has once had a fault but automatically recovered from the fault. Therefore, it becomes possible to estimate that the fault is not a fault of the femto base station itself, but a fault caused by an external network or the like, for example.

In FIG. 8A to FIG. 8D, the total number of the abnormality reports within the predetermined period is 51 in each case; therefore, it is difficult for the EMS 10 to discriminate types of the faults by simply comparing the numbers of the messages. Therefore, the EMS 10 analyzes a histogram to discriminate the types of the faults, and gives a report to a maintenance/management personnel. FIG. 9A is a diagram for explaining a method of analyzing a histogram. As illustrated in FIG. 9A, a predetermined period corresponding to a duration of 30 seconds ("12:00:00" to "12:00:30") is divided into an early part, a middle part, and a late part, each corresponding to eight lots. The early eight lots are grouped from "12:00:00" to "12:00:14", the middle eight lots are grouped from "12:00:08" to "12:00:22", and the late eight lots are grouped from "12:00:16" to "12:00:30".

FIG. 9B is a diagram illustrating a distribution ratio of the abnormality report messages for each of the early part, the middle part, and the late part. If the predetermined period is divided into 16 parts and a histogram of the arrived abnormality report messages is generated, the distribution ratio of the early part is calculated by dividing the number of the abnormality reports in the early eight lots by the total number (51) of the abnormality reports. Further, the distribution ratio of the middle part is calculated by dividing the number of the abnormality reports in the middle eight lots by the total number (51) of the abnormality reports. Similarly, the distribution ratio of the late part is calculated by dividing the number of the abnormality reports in the late eight lots by the total number (51) of the abnormality reports. Therefore, the distribution ratio of the early part, for which the number of the abnormality reports in the lots is 27, is calculated to be 52.9% by dividing 27 by 51 as illustrated in FIG. 9B. Further, the distribution ratio of the middle part, for which the number of the abnormality reports in the lots is 50, is calculated to be 98.0% by dividing 50 by 51 as illustrated in FIG. 9B. Similarly, the distribution ratio of the late part, for which the number of the abnormality reports in the lots is 24, is calculated to be 47.1% by dividing 24 by 51 as illustrated in FIG. 9B. The EMS 10, from the tendency of the distribution ratios, can obtain a distribution in which the abnormality reports are concentrated in the middle part, that is, an analysis result indicating that a temporary fault is automatically resolved.

Next, the periodic monitoring sequence will be described in detail.

Figure 10A:
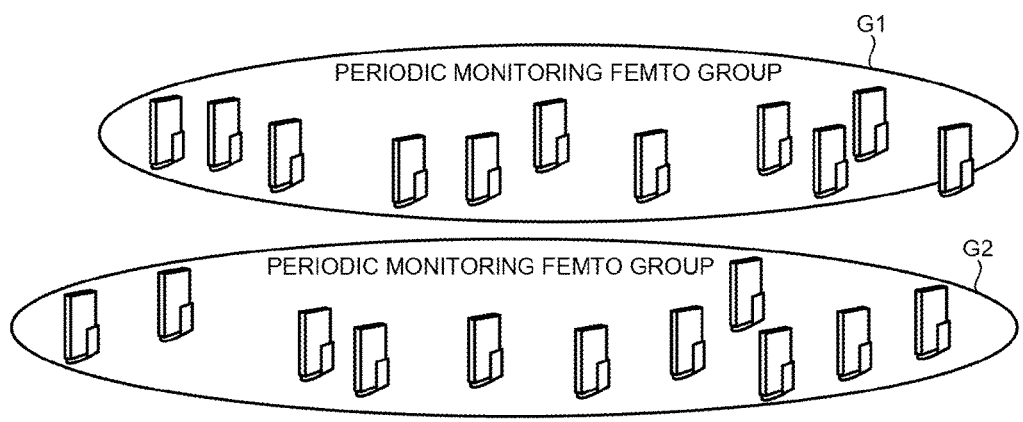
FIG. 10A is a diagram illustrating periodic monitoring femto groups.

FIG. 10A is a diagram illustrating periodic monitoring femto groups G1 and G2. As illustrated in FIG. 10A, the EMS 10 divides a large number of femto base stations, which serve as monitoring targets, into a plurality of the groups G1 and G2 and designs each of the femto base stations belonging to each of the groups G1 and G2 to execute the periodic monitoring sequence. The number of the femto base stations (hereinafter, described as a "registered femto number Z") managed in a single group is, for example, 100; however, the number may differ for each group.

Figure 10B:
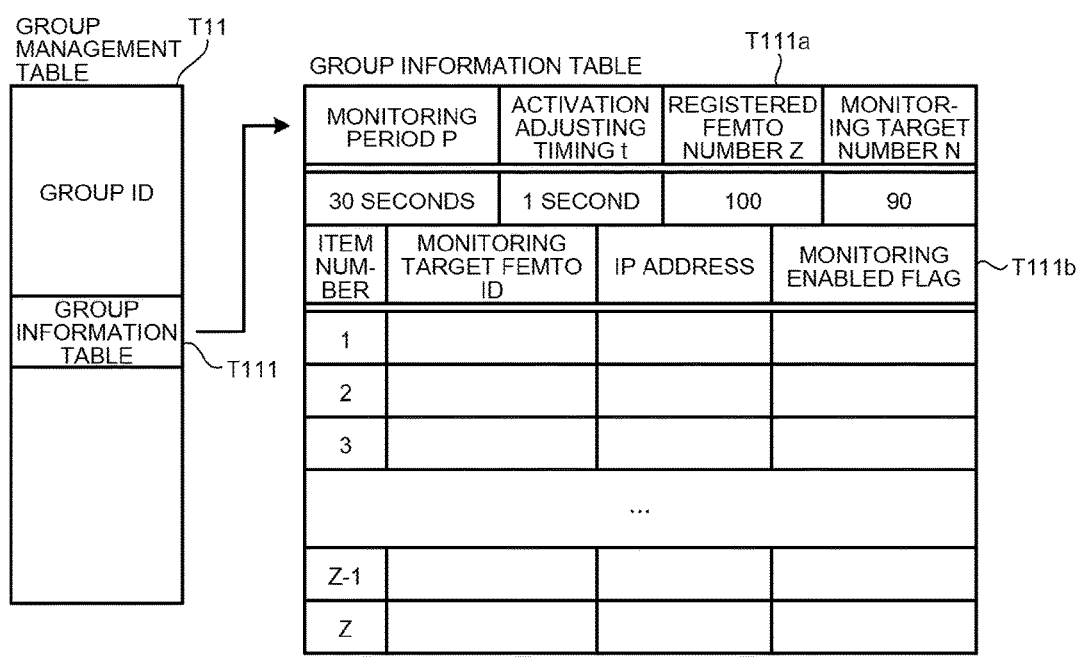
FIG. 10B is a diagram illustrating a configuration example of a group management table used by the EMS in the periodic monitoring sequence.

FIG. 10B is a diagram illustrating a configuration example of a group management table T1 used by the EMS 10 in the periodic monitoring sequence. As illustrated in FIG. 10B, the group management table T11 contains a group ID for identifying a periodic monitoring femto group and a group information table T111 for storing the periodic monitoring femto group and attribute information on each of the femto base stations in the group. Further, the group information table T111 contains common information T111a that is common to the femto base stations in the group and individual information T111b that is specific to each of the femto base stations. The common information T111a includes a monitoring period P (for example, 30 seconds), an activation adjusting timing t (for example, one second), the registered femto number Z in the group (for example, 100), and a monitoring target number N that is the number of monitoring targets in the group (for example, 90). The individual information T111b includes a monitoring target femto ID, an IP address, and a monitoring enabled flag for each item number. The monitoring enabled flag is information indicating whether a corresponding monitoring target femto is currently enabled as a monitoring target of the EMS 10. If the monitoring enabled flag is set to "1", it is indicated as being enabled as a monitoring target. If the monitoring enabled flag is set to "0", it is indicated as being disabled as a monitoring target.

Figure 11:
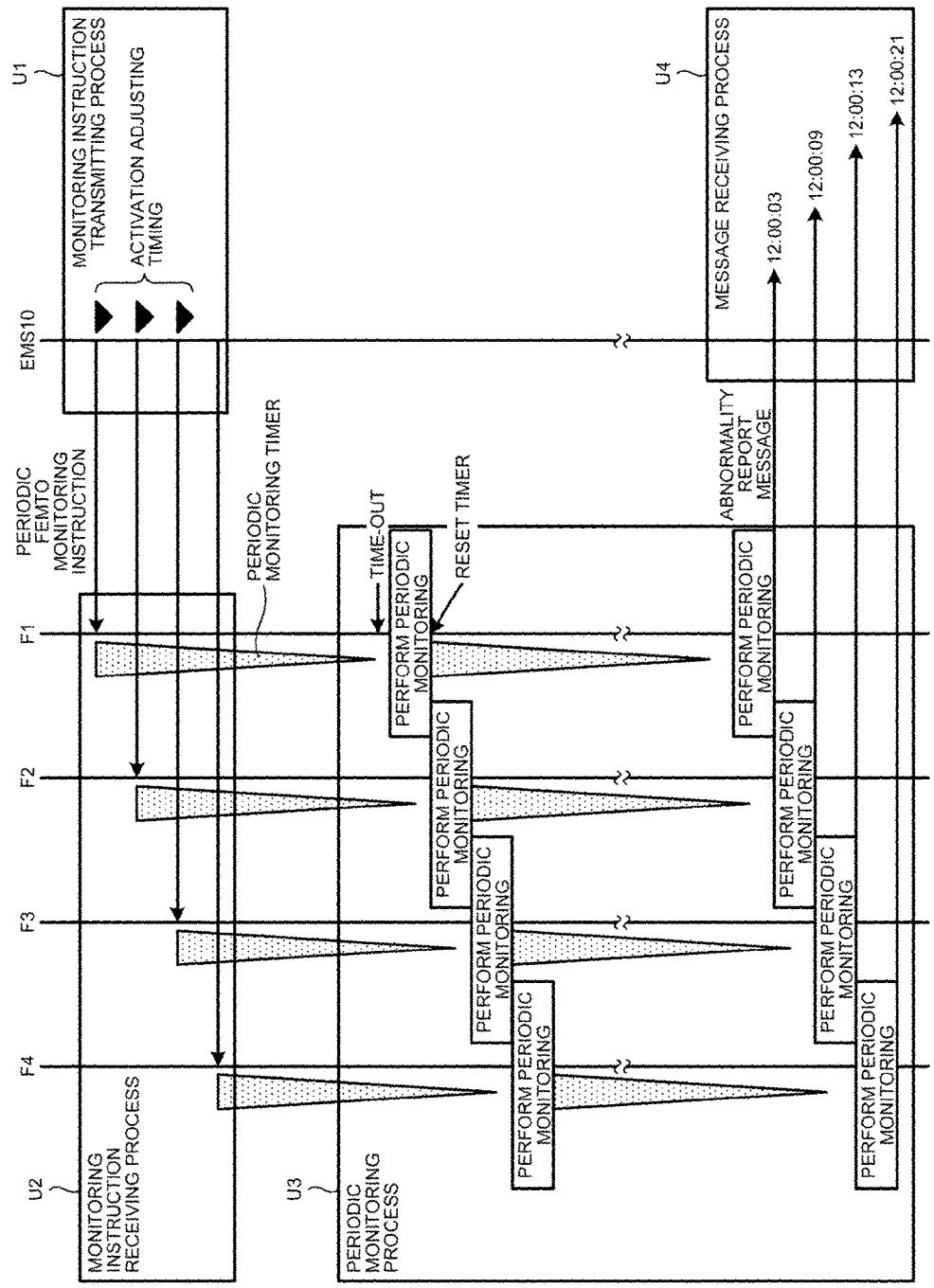
FIG. 11 is a diagram illustrating processes of the periodic monitoring sequence.

FIG. 11 is a diagram illustrating processes of the periodic monitoring sequence. As illustrated in FIG. 11, the periodic monitoring sequence is divided into four processes such as a monitoring instruction transmitting process at U1, a monitoring instruction receiving process at U2, a periodic monitoring process at U3, and a message receiving process at U4. The four processes are performed for each of the periodic monitoring femto groups.

Figure 12:
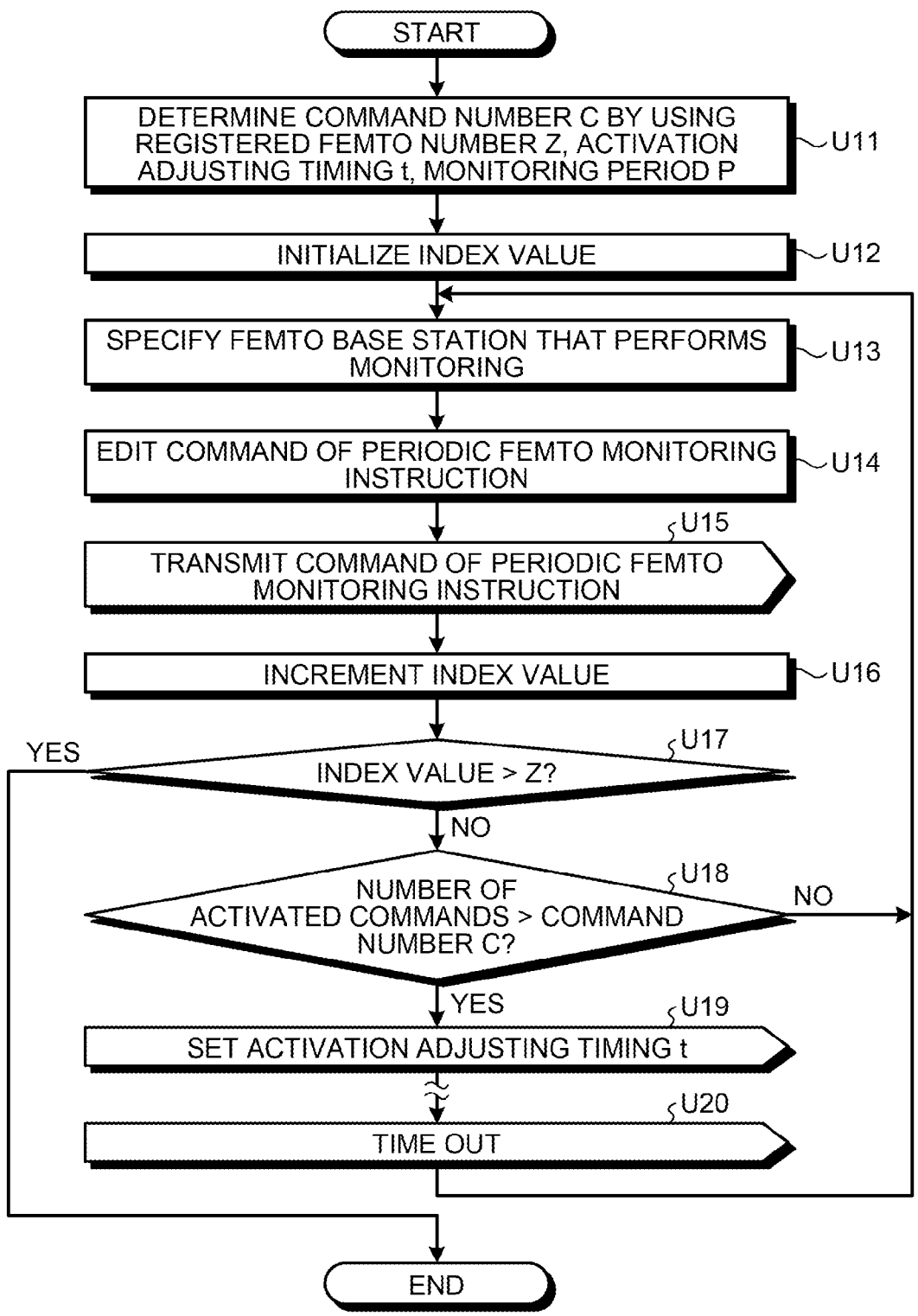
FIG. 12 is a flowchart for explaining a monitoring instruction transmitting process performed by the EMS.

FIG. 12 is a flowchart for explaining the monitoring instruction transmitting process performed by the EMS 10. At U11, the EMS 10 determines a command number C that is the number of commands of the periodic femto monitoring instructions to be issued in a single period, by using the registered femto number Z, the activation adjusting timing t, and the monitoring period P registered in the group information table T111. The command number C is calculated such that C=Z/t/P, for example. Subsequently, the EMS 10 sets a value of the item number (an index value) to "0" for initialization (U12), and specifies, from the index value, a femto base station that performs monitoring (U13).

At U14, the EMS 10 edits a command of the periodic femto monitoring instruction. Specifically, the EMS 10 edits the command by generating a list of pieces of identification information (for example, the femto IDs and the IP addresses) on femto base stations with the monitoring enabled flags of "1" among the monitoring target femto base stations registered in the group information table T111. At U15, the EMS 10 transmits the command of the periodic femto monitoring instruction to the femto base station specified at U13. After the transmission, the EMS 10 increments the index value by one (U16).

At U17, the EMS 10 determines whether the index value exceeds the registered femto number Z. As a result of the determination, if it exceeds (YES at U17), subsequent processes are omitted and a series of processes of the monitoring instruction transmitting process ends. In contrast, if it does not exceed (NO at U17), the EMS 10 further determines whether the number of commands of the periodic femto monitoring instructions activated within the monitoring period exceeds the command number C determined at U11 (U18). As a result of the determination, if it exceeds (YES at U18), the EMS 10 sets the activation adjusting timing t again (U19), and performs the processes from U13 again upon time-out (U20). As a result of the determination at U18, if it does not exceed (NO at U18), the EMS 10 returns to U13 and performs the subsequent processes again.

Figure 13:
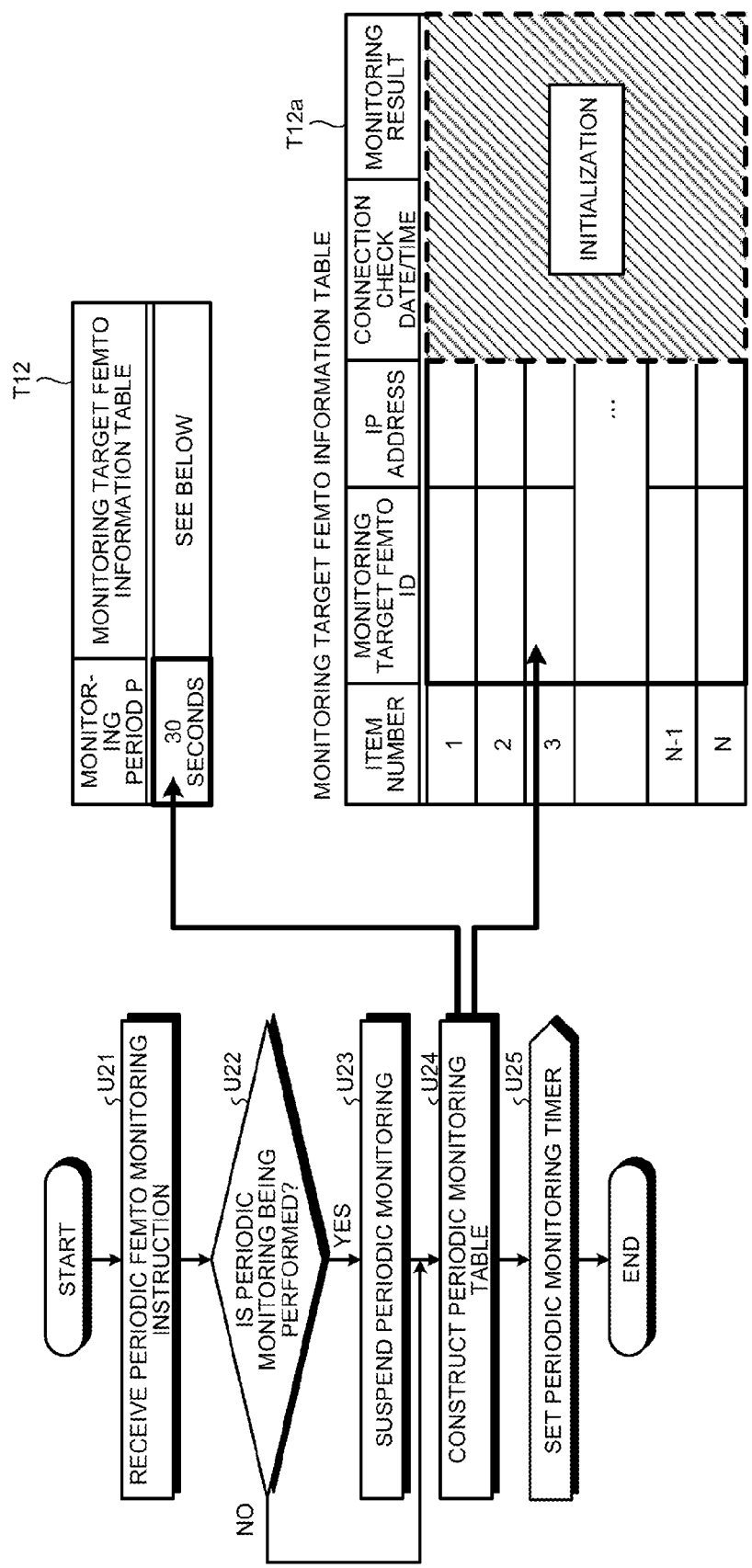
FIG. 13 is a flowchart for explaining a monitoring instruction receiving process performed by the femto base station.

FIG. 13 is a flowchart for explaining the monitoring instruction receiving process performed by the femto base station F1. The femto base station F1, upon receiving the command of the periodic femto monitoring instruction (U21), determines whether periodic monitoring is being performed (U22). As a result of the determination, if the monitoring is being performed (YES at U22), the femto base station F1 suspends the monitoring process being performed (U23). At U24, the femto base station F1 constructs a periodic monitoring table T12. The periodic monitoring table T12 contains, as illustrated in FIG. 13, the monitoring period P and a monitoring target femto information table T12a to be described later. In the monitoring period P, "30 seconds" is set, which is a value of the monitoring period included in the periodic femto monitoring instruction. The monitoring target femto information table T12a is constructed in accordance with information notified by the EMS 10, and stores therein a monitoring target femto ID, an IP address, a connection check date and time, and a monitoring result for each item number in an associated manner.

As a result of the determination at U22, if the monitoring is not being performed (NO at U22), the femto base station F1 omits the process at U23 and performs the construction process at U24. At U25, the femto base station F1 activates the periodic monitoring timer and sets a value of the monitoring period P as a timer value.

While the process performed by the femto base station F1 is described in a representative manner in FIG. 13, the same process is performed in the other femto base stations F2 to F100.

Figure 14:
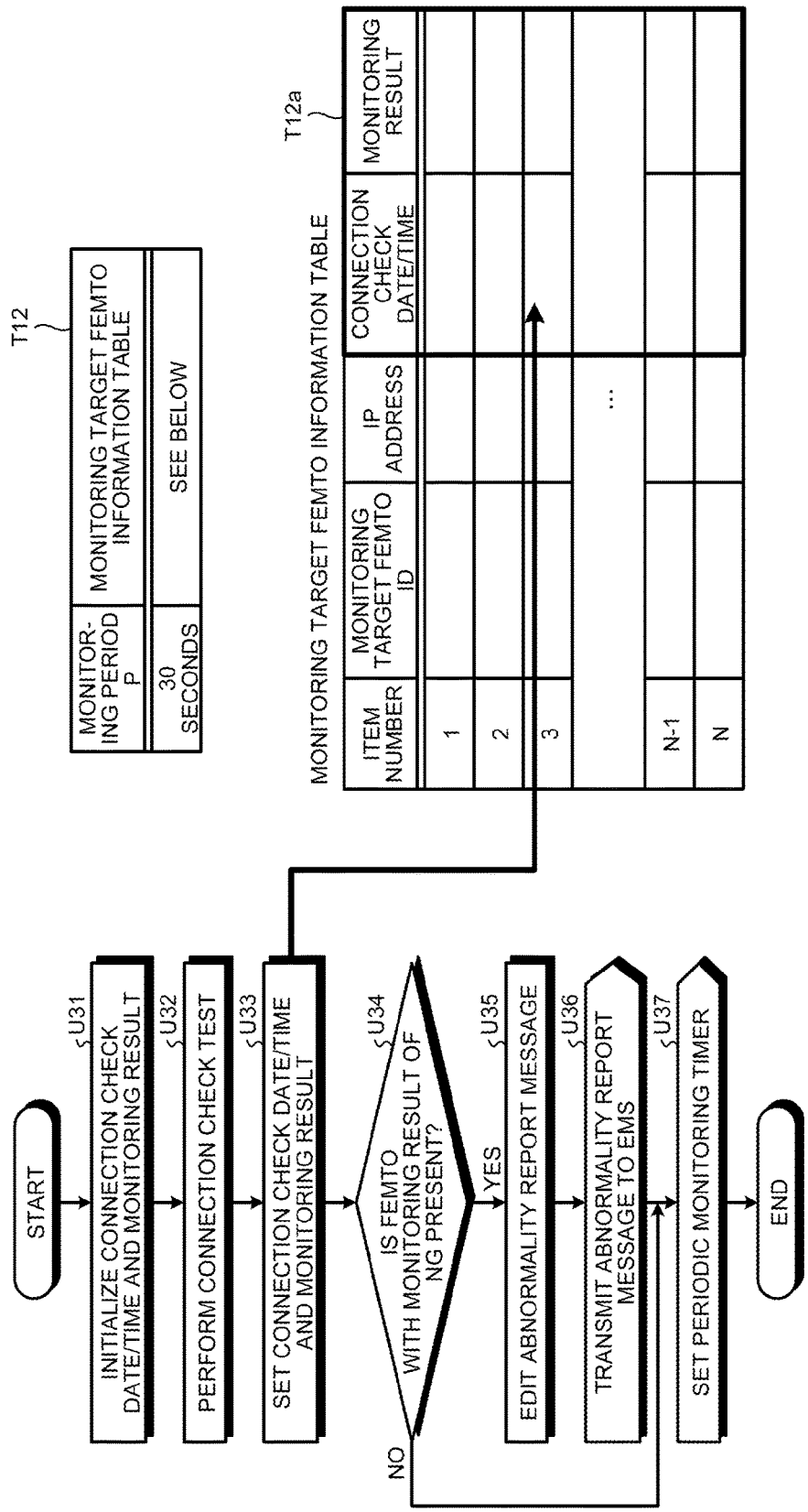
FIG. 14 is a flowchart for explaining a periodic monitoring process performed by the femto base station.

FIG. 14 is a flowchart for explaining the periodic monitoring process performed by the femto base station F1. At U31, the femto base station F1, upon detecting time-out of the periodic monitoring timer, initializes the connection check date and time and the monitoring result of the monitoring target femto information table T12a. At U32, the femto base station F1 performs a connection check test on all of the monitoring target femto base stations registered in the monitoring target femto information table T12a. At U33, the femto base station F1 sets a date and time of execution of the connection check test and a monitoring result in the monitoring target femto information table T12a for each item number.

At U34, the femto base station F1 determines the presence or absence of a femto base station with a monitoring result of NG (fault) as a result of the execution of the connection check test. As a result of the determination, if a femto base station with the monitoring result of NG is present (YES at U34), the femto base station F1 edits an abnormality report message (U35). Specifically, the femto base station F1 records, in the abnormality report message, a list of IDs and connection check dates and times of all of the femto base stations in which faults have been detected. At U36, the femto base station F1 transmits the abnormality report message to the EMS 10. At U37, the femto base station F1 activates the periodic monitoring timer and resets a value of the monitoring period P as a timer value.

As a result of the determination at U34, if a femto station with the monitoring result of NG is not present (NO at U34), the femto base station F1 omits the processes at U35 and U36, and performs the process of setting the timer at U37.

While the process performed by the femto base station F1 is described in a representative manner in FIG. 14, the same process is performed in the other femto base stations F2 to F100.

Figure 15:
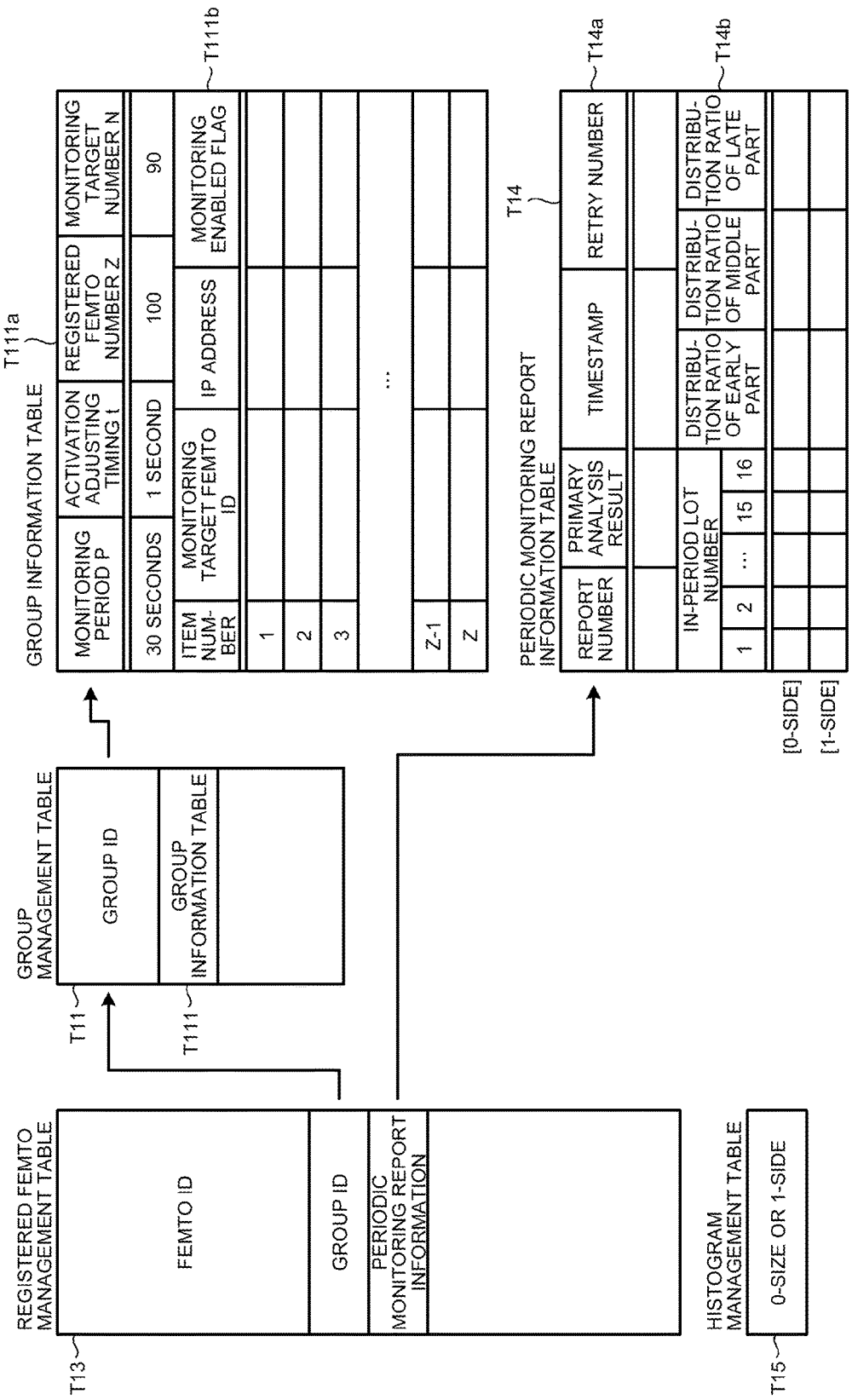
FIG. 15 is a diagram for explaining a method of managing results of periodic monitoring in the EMS.

FIG. 15 is a diagram for explaining a method of managing results of periodic monitoring in the EMS 10. As illustrated in FIG. 15, the EMS 10 generates periodic monitoring report information based on the monitoring results collected from the femto base stations F1 to F100. A registered femto management table T13, through a search by using the identifier (femto ID) of a femto base station as a key, provides an ID (group ID) of the periodic monitoring femto group to which the corresponding femto base station belongs and provides periodic monitoring report information. The group ID is used to specify group information (the common information T111a and the individual information T111b) via the group management table T11. The periodic monitoring report information is used as input information of a fault analysis algorithm.

A periodic monitoring report information table T14 contains an algorithm data area T14a for storing various types of information (for example, the number of reports, a result of a primary analysis, a timestamp of periodic monitoring, and the number of retries) used in the fault analysis algorithm. Further, the periodic monitoring report information table T14 includes a histogram table T14b for storing the number of arrived abnormality report messages for each lot number in a period (hereinafter, described as an "in-period lot number") and stores therein the distribution ratios of the early part, the middle part, and the late part. The histogram table T14b is provided with two sides, and which of the sides is to be used to count the number of the abnormality report messages is defined by a histogram management table T15.

Figure 16:
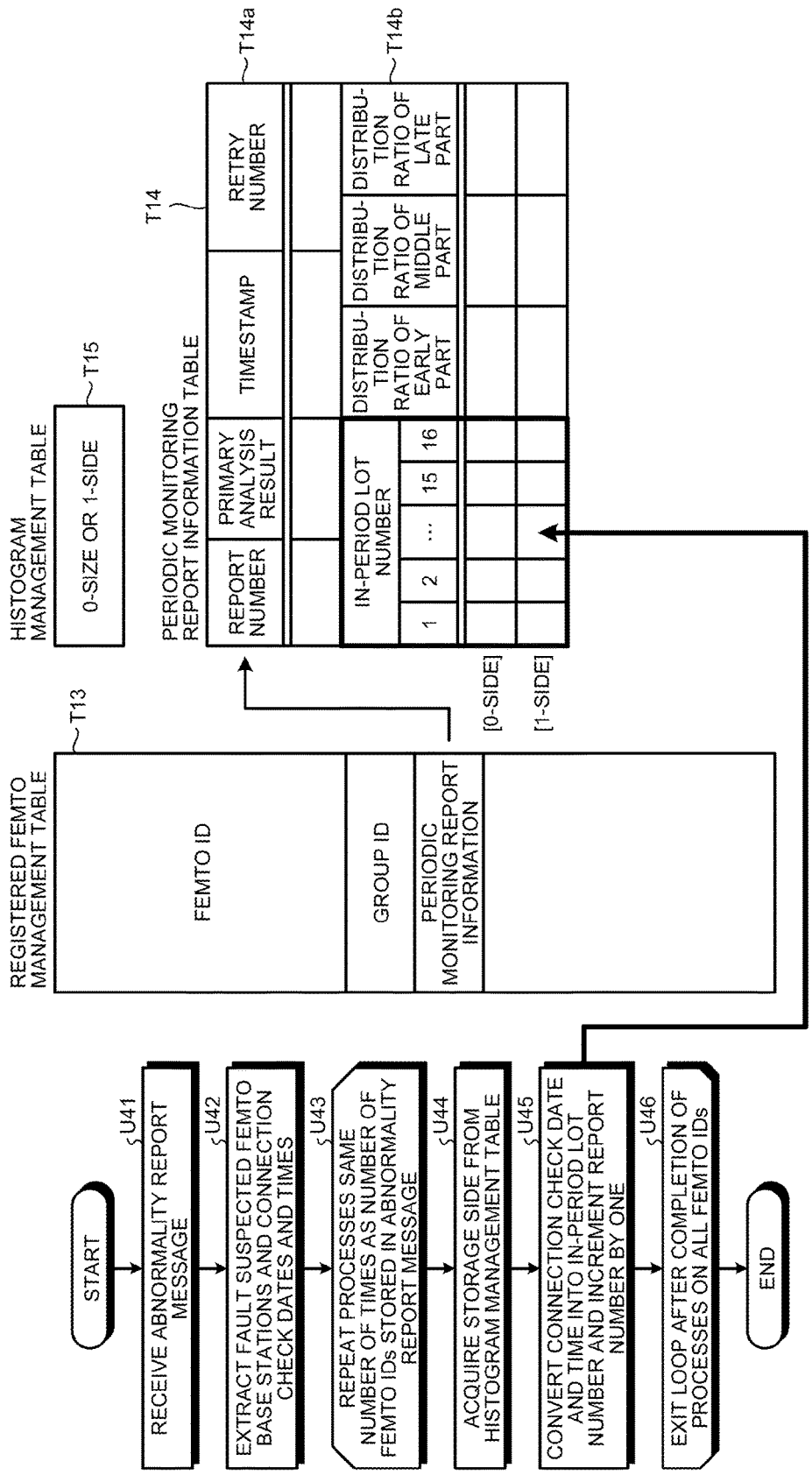
FIG. 16 is a flowchart for explaining a message receiving process performed by the EMS.

FIG. 16 is a flowchart for explaining the message receiving process performed by the EMS 10. The EMS 10, upon receiving the abnormality report message (U41), extracts the IDs and the connection check dates and times of fault suspected femto base stations from the abnormality report message (U42). At U43, the EMS 10 repeats the processes at U44 and U45, which will be described later, the same number of times as the number of the femto IDs stored in the abnormality report message. At U44, the EMS 10 acquires a side for counting the number of the abnormality report messages (a storage side of the histogram table T14b) from the histogram management table T15. At U45, the EMS 10 converts each connection check date and time extracted at U42 into the in-period lot number, and increments the number of abnormality reports in a corresponding field by one. The EMS 10, upon completing the processes at U44 and U45 on all of the femto IDs stored in the abnormality report message, ends a series of processes of the message receiving process (U46).

Figure 17:
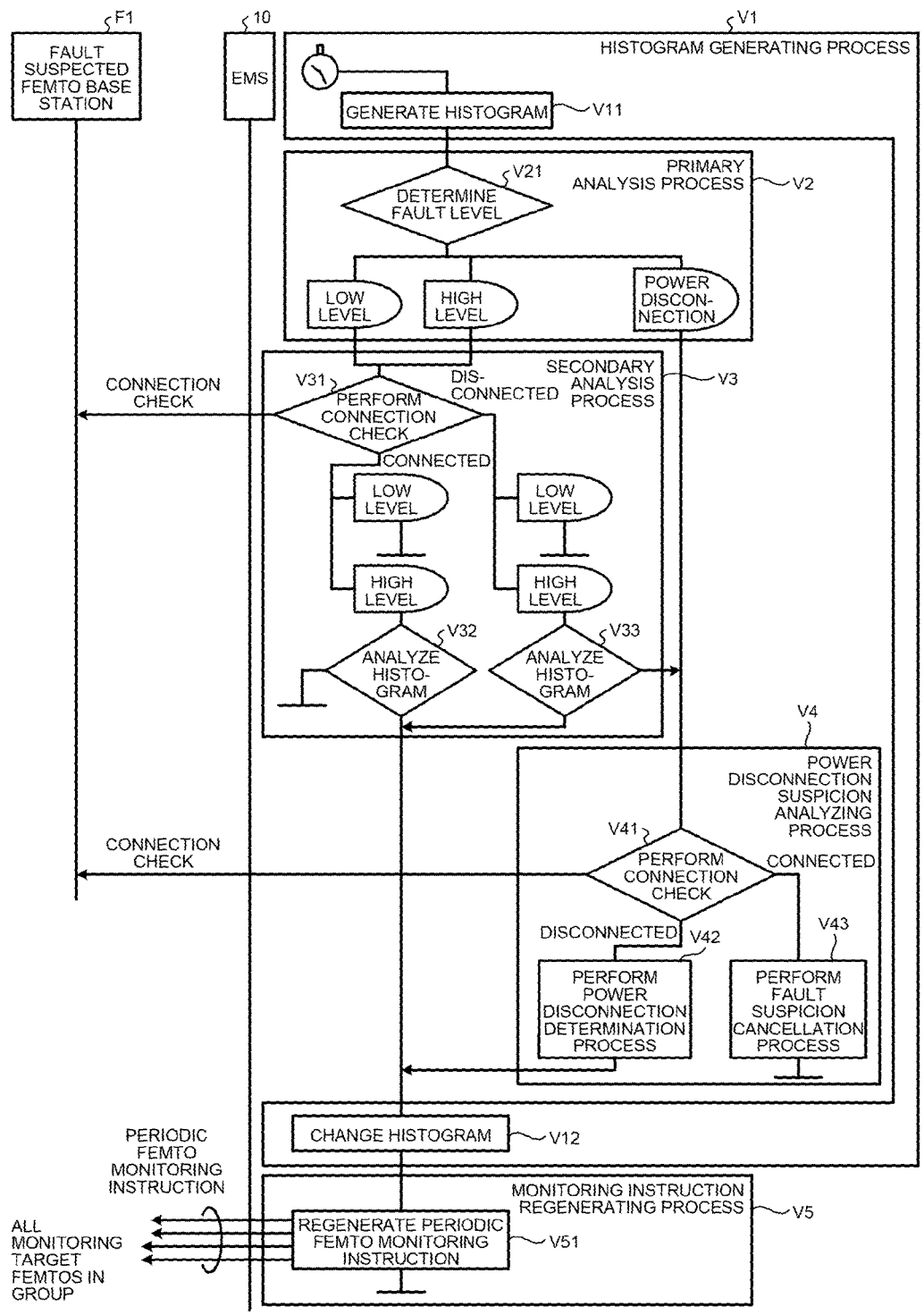
FIG. 17 is a diagram illustrating processes of a fault analysis algorithm.

FIG. 17 is a diagram illustrating processes of the fault analysis algorithm. As illustrated in FIG. 17, the fault analysis algorithm is divided into five processes such as a histogram generating process at V1, a primary analysis process at V2, a secondary analysis process at V3, a power disconnection suspicion analyzing process at V4, and a monitoring instruction regenerating process at V5. The five processes are performed for each of the periodic monitoring femto groups.

The EMS 10 determines a fault level based on the histogram generated at V11 (V21), and if the fault level is of a low level or a high level, performs a connection check on the fault suspected femto base station F1 (V31). If a result of the connection check is "connected", the EMS 10 analyzes the histogram (V32), changes the histogram (V12), and regenerates the periodic femto monitoring instruction (V51). In contrast, if the result of the connection check is "disconnected", the EMS 10 analyzes the histogram (V33), performs the connection check again (V41), and if the result is "disconnected", performs a power disconnection determination process to be described later (V42). Further, if the result is "connected", the EMS 10 performs a fault suspicion cancellation process to be described later (V43).

Figure 18:
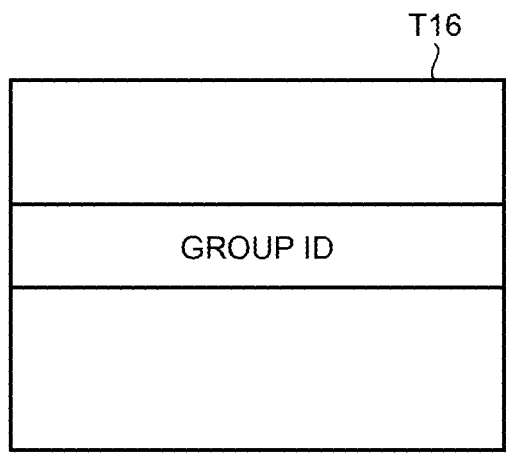
FIG. 18 is a diagram illustrating a configuration example of a periodic-monitoring-instruction regeneration management table.

FIG. 18 is a diagram illustrating a configuration example a periodic-monitoring-instruction regeneration management table T16. As illustrated in FIG. 18, the periodic-monitoring-instruction regeneration management table T16 stores therein an ID (group ID) of the periodic monitoring femto group. The group ID, when it is determined that a femto base station is to be deleted from the monitoring femto matrix list L1 in the secondary analysis process and the power disconnection suspicion analyzing process, indicates a periodic monitoring femto group to which the femto base station belongs.

With reference to FIG. 19 to FIG. 23, the fault analysis algorithm illustrated in FIG. 17 will be described in detail below.

Figure 19:
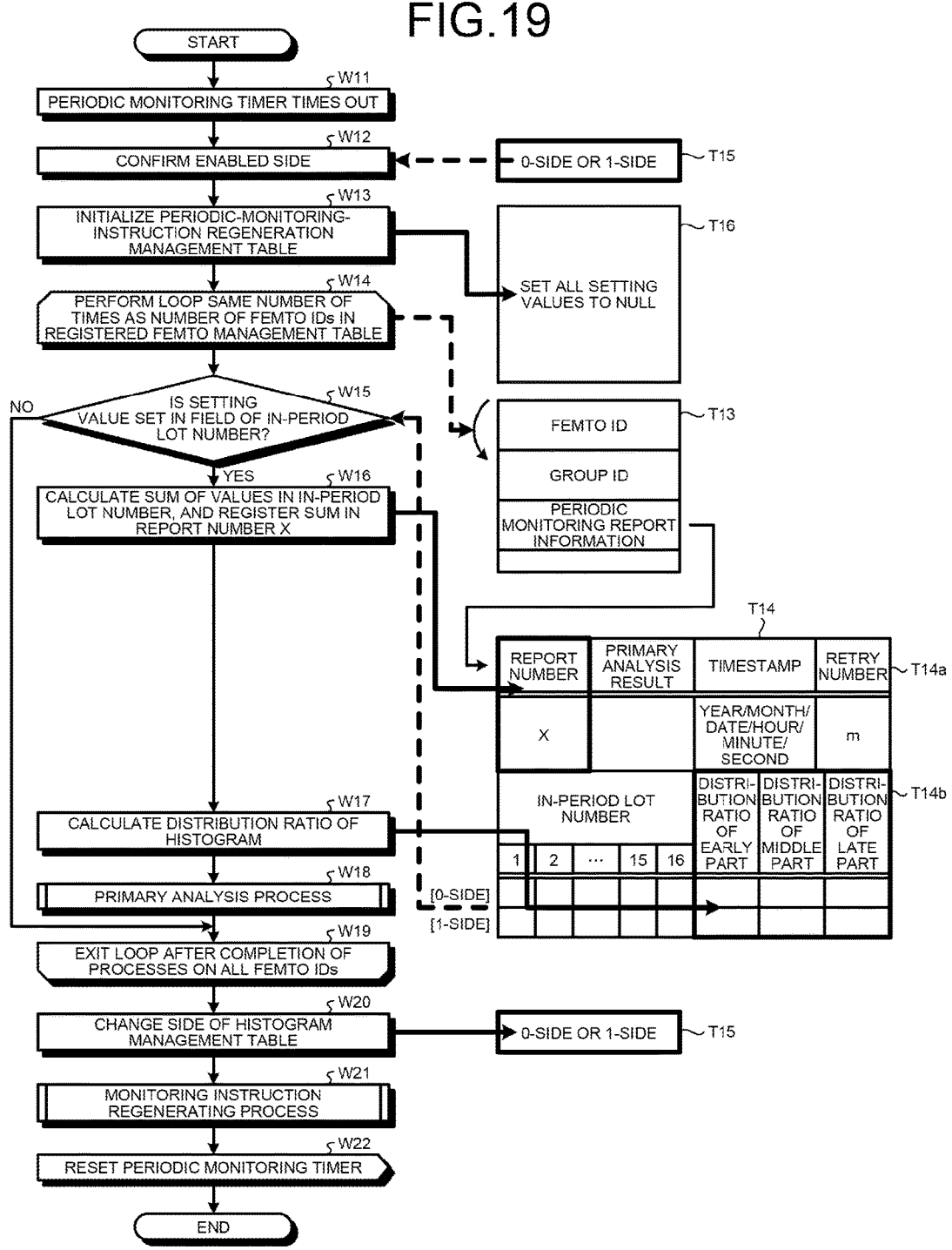
FIG. 19 is a flowchart for explaining a histogram generating process performed by the EMS.

FIG. 19 is a flowchart for explaining the histogram generating process performed by the EMS 10. The EMS 10, when the periodic monitoring timer that operates in synchronization with time has timed out (W11), confirms an enabled side by referring to the histogram management table T15 (W12). At W13, the EMS 10 sets all setting values in the periodic-monitoring-instruction regeneration management table T16 to null for initialization.

At W14, the EMS 10 starts a process (loop) to repeat processes from W16 to W18, which will be described later, the same number of times as the number of the femto IDs registered in the registered femto management table T13. At W15, the EMS 10 determines whether a setting value is set in any of fields of the in-period lot number on the enabled side confirmed at W12. As a result of the determination, if the setting value is set (YES at W15), the EMS 10 calculates the sum of the values in all of the fields of the in-period lot number in the histogram table T14b, registers the sum in a report number X in the algorithm data area T14a (W16).

Then, the EMS 10 determines that the abnormality report messages are received within the monitoring period, and analyzes the histogram at W17.

In the analysis of the histogram at W17, the EMS 10 calculates the distribution ratio of the histogram for each of the early part, the middle part, and the late part. Specifically, the EMS 10 calculates the sum of values set in the early eight lots among the in-period lot numbers 1 to 16, divides the sum by the report number X of all of the lots, and centuplicates the quotient, thereby calculating the distribution ratio of the early part. Similarly, the EMS 10 calculates the distribution ratio of the middle part by dividing the sum of the values set in the middle eight lots among the in-period lot numbers 1 to 16 by the report number X. Similarly, the EMS 10 calculates the distribution ratio of the late part by calculating the sum of values set in the late eight lots among the in-period lot numbers 1 to 16, dividing the sum by the report number X of all of the lots, and centuplicating the quotient. At W18, the EMS 10 performs the primary analysis process to be described later. The EMS 10, upon completing execution of the processes from W15 to W18 on all of the femto IDs registered in the registered femto management table T13, exits the loop and performs a process at W20 to be described below (W19).

As a result of the determination at W15, if the setting value is not set (NO at W15), the processes from W16 to W18 are omitted.

Thereafter, the EMS 10 changes the side of the histogram management table T15 (W20), and performs the monitoring instruction regenerating process to be described later (W21). At W22, the EMS 10 activates the periodic monitoring timer and resets the value of the monitoring period P as a timer value.

Figure 20:
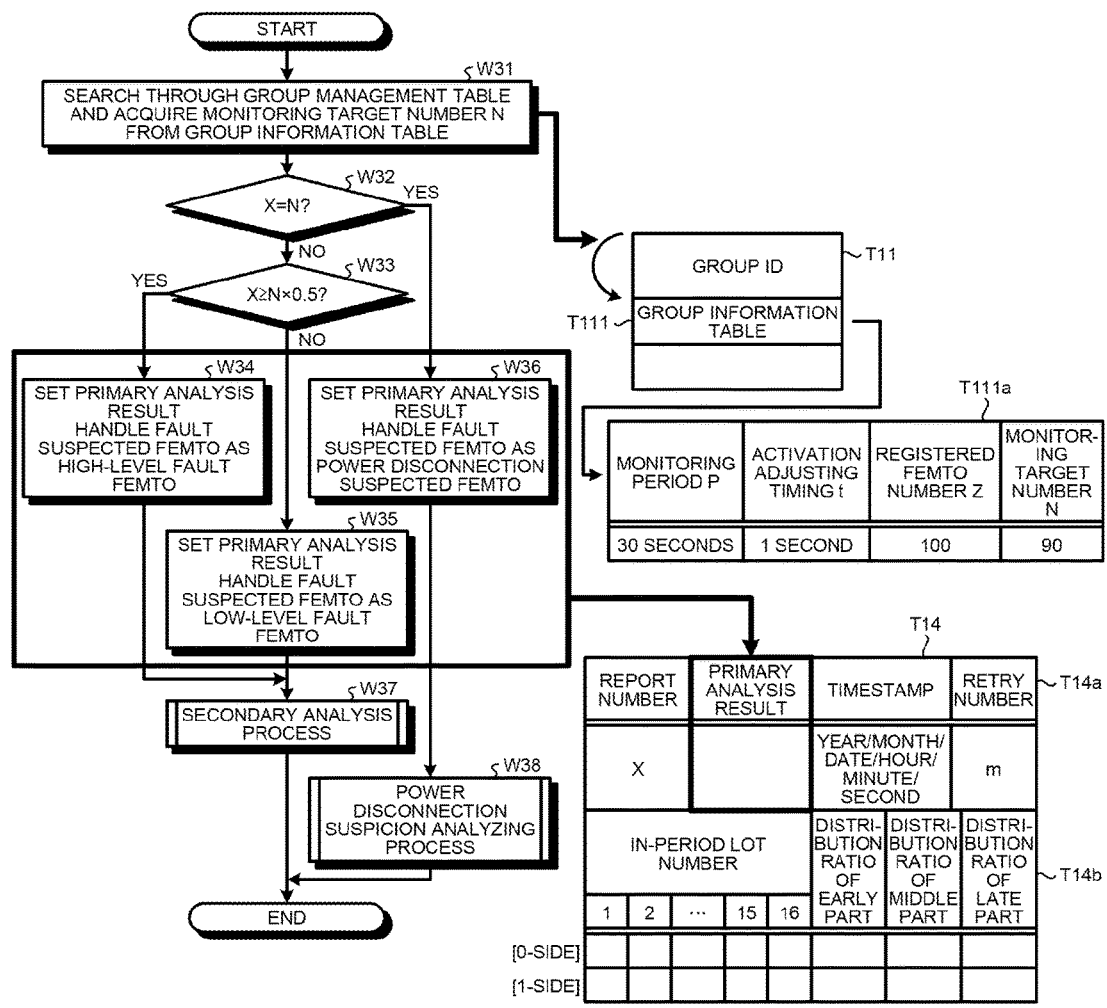
FIG. 20 is a flowchart for explaining a primary analysis process performed by the EMS.

FIG. 20 is a flowchart for explaining a primary analysis process performed by the EMS 10. At W31, the EMS 10 searches through the group management table T11 by using the group ID as a key, and acquires the monitoring target number N (for example, 90) from the common information T111a of the group information table T111 (see FIG. 15). At W32, the EMS 10 determines whether the report number X registered in the algorithm data area T14a is equal to the monitoring target number N. As a result of the determination, if the report number X≠ the monitoring target number N (NO at W32), the EMS 10 further determines whether the report number X is equal to or greater than 50% of the monitoring target number N (W33). The value of 50% is a default value of a threshold for determining the fault level, but may be changed appropriately depending on the number of femto base stations serving as the monitoring targets, the performance or reliability needed in the monitoring system, or the like.

As a result of the determination at W33, if the report number X≥ the monitoring target number N×0.5 (YES at W33), the EMS 10 sets a "high-level fault femto", as a primary analysis result, in the algorithm data area T14a of the periodic monitoring report information table T14. In contrast, if the report number X of < the monitoring target number N×0.5 (NO at W33), the EMS 10 sets a "low-level fault femto", as a primary analysis result, in the algorithm data area T14a of the periodic monitoring report information table T14. Further, as a result of the determination at W32, if the report number X=the monitoring target number N (YES at W32), the EMS 10 sets a "power disconnection suspected femto", as a primary analysis result, in the algorithm data area T14a of the periodic monitoring report information table T14.

After completing the processes at W34 and W35, the EMS 10 performs the secondary analysis process to be described later (W37). Further, after completing the process at W36, the EMS 10 performs the power disconnection suspicion analyzing process to be described later (W38).

FIG. 21 is a flowchart for explaining the secondary analysis process performed by the EMS 10. At W41, the EMS 10 attempts a connection using TR-069 to the fault suspected femto base station F1. As a result of the attempt, if a result of the connection check is "disconnected (no reply)" (YES at W42), the EMS 10 performs a process in accordance with a result the primary analysis result. Specifically, if the primary analysis result is the "high-level fault femto" (YES at W43), the EMS 10 analyzes the histogram. As a result of the analysis, if the distribution ratio of the late part is equal to or greater than 75% (YES at W44), arrival of the abnormality report messages is greatly concentrated in the late part of the monitoring period; therefore, the fault suspected femto base station F1 may be in a power disconnected state. Therefore, the EMS 10 changes the primary analysis result from the "high-level fault femto" to a "power disconnection suspected femto" (W45), interrupts the secondary analysis process, and switches to the power disconnection suspicion analyzing process (W46).

As a result of the determination at W44, if the distribution ratio of the late part is smaller than 75% (NO at W44), the EMS 10 determines that the fault suspected femto base station F1 has a "permanent fault", and notifies a maintenance/management personnel of occurrence of the permanent fault (W47). At W48, the EMS 10 sets a state of a flag corresponding to the ID of the femto base station determined as having the permanent fault to "disabled" among the monitoring enabled flags in the individual information T111b of the group information table T111. Therefore, the femto base station determined as having the permanent fault is deleted from the monitoring femto matrix list L1.

At this time, if a femto group to be monitored is not registered, the EMS 10 registers the ID of the femto group in the periodic-monitoring-instruction regeneration management table T16 (W49).

As a result of the determination at W43, if the primary analysis result is not the "high-level fault femto" (NO at W43), the EMS 10 determines that the fault suspected femto base station F1 has a "process fault" without analyzing the histogram, and notifies a maintenance/management personnel of occurrence of the process fault (W50). The process fault is a fault, in which a driver or the like of the femto base station operates normally but any defect occurs in the application processing unit. For example, process stack, process loss, or the like corresponds to the process fault.

As a result of the determination at W42, if a result of the connection check is "connected (normal reply)" (NO at W42), the EMS 10 performs a process in accordance with the primary analysis result. Specifically, if the primary analysis result is a "high-level fault femto" (YES at W51), the EMS 10 analyzes the histogram. As a result of the analysis, if the distribution ratio of the early part is equal to or greater than 75% (YES at W52), arrival of the abnormality report messages is greatly concentrated in the early part of the monitoring period; therefore, it is possible to estimate that a cause of the fault lies not in the femto base station itself but in an external environment, such as a network. Further, there may be a case in which the fault suspected femto base station has been able to give a notice on the fault. Therefore, if the distribution ratio of the early part is equal to or greater than 75%, the EMS 10 waits for a while without giving a notice to a maintenance/management personnel.

In contrast, if the distribution ratio of the early part is smaller than 75% (NO at W52), the EMS 10 analyzes the histogram. As a result of the analysis, if the distribution ratio of the middle part is equal to or greater than 75% (YES at W53), arrival of the abnormality report messages is greatly concentrated in around the middle part of the monitoring period, it is possible to estimate that a cause of the fault lies not in the femto base station itself but in an external environment, such as a network. Further, there may be a case in which the fault suspected femto base station has been able to give a notice on the fault. Therefore, even when the distribution ratio of the middle part is equal to or greater than 75%, the EMS 10 does not give a notification to the maintenance/management personnel.

As a result of the determination at W53, if the distribution ratio of the middle part is smaller than 75% (NO at W53), the EMS 10 determines that the fault suspected femto base station F1 has a "process fault", and notifies the maintenance/management personnel of occurrence of the process fault (W54). The process fault in this case may be, for example, deficiency or depletion of wireless resources, a high-load state of a processor of the femto base station, or the like.

As a result of the determination at W51, if the primary analysis result is not the "high-level fault femto" (NO at W51), the EMS 10 determines that the fault suspected femto base station F1 has an "intermittent fault" without analyzing the histogram. Then, the EMS 10 notifies the maintenance/management personnel of occurrence of the intermittent fault (W55) to call attention to the fault.

Figure 22:
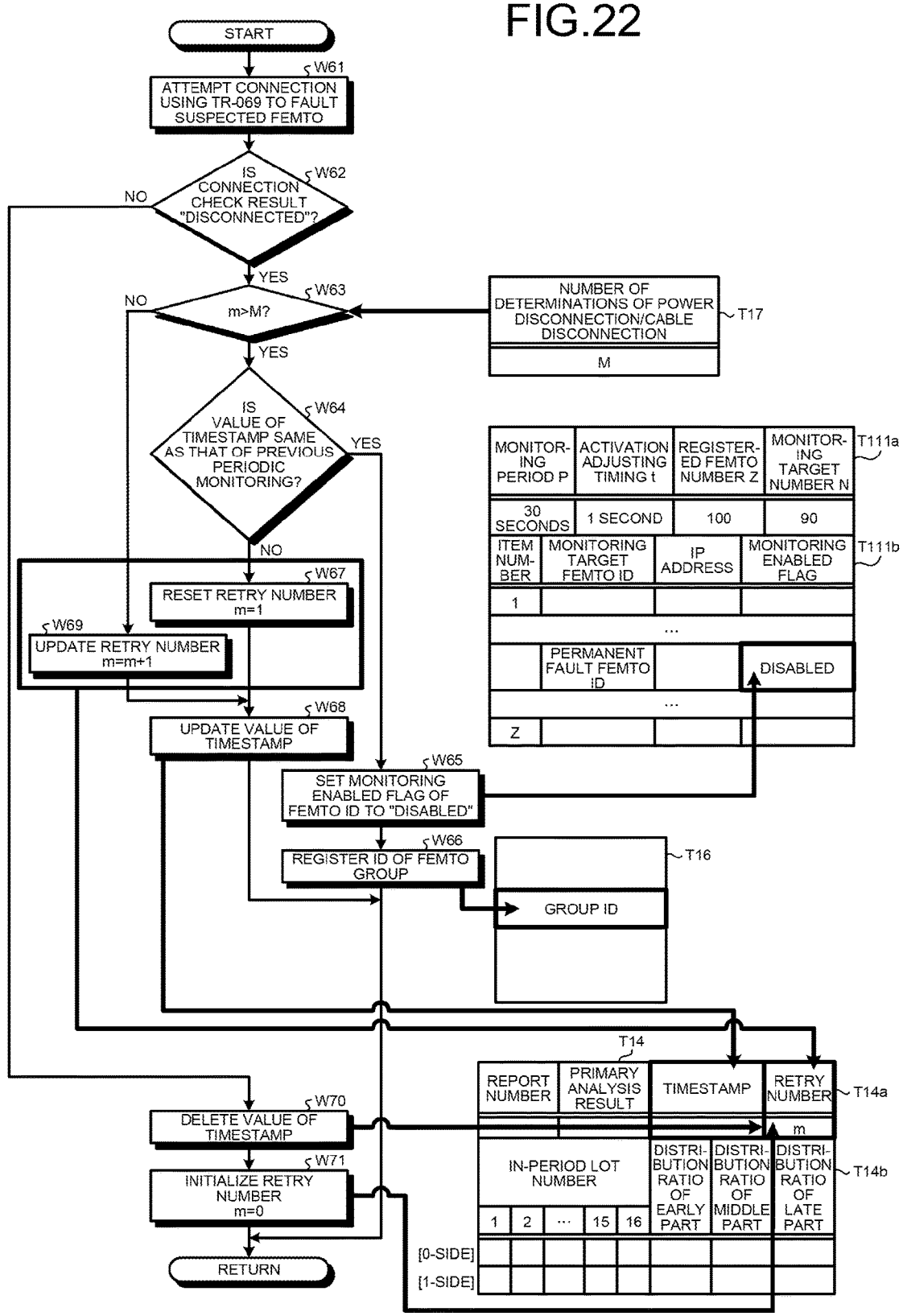
FIG. 22 is a flowchart for explaining a power disconnection suspicion analyzing process performed by the EMS.

FIG. 22 is a flowchart for explaining the power disconnection suspicion analyzing process performed by the EMS 10. At W61, the EMS 10 attempts a connection using TR-069 to the fault suspected femto base station F1. As a result of the attempt, if a result of the connection check is "disconnected (no reply)" (YES at W62), the fault suspected femto base station F1 is suspected of having a power disconnection or a cable disconnection. Therefore, the EMS 10 determines whether a retry number m, which is the number of retries, in the algorithm data area T14a in the periodic monitoring report information table T14 is greater than a determination number M, which is the number of determinations of a power disconnection or a cable disconnection (W63). The determination number M of a power disconnection or a cable disconnection is set such that "M=10" for example, but may be variably set depending on the time needed for the femto base station to reboot (for example, about five minutes), the performance or reliability needed in the monitoring system, or the like.

As a result of the determination at W63, if m>M (YES at W63), the EMS 10 checks a value of the timestamp in the algorithm data area T14a, and determines whether the value is the same as the value of the timestamp of previous periodic monitoring (W64). As a result of the determination, the value is the same as that of the previous periodic monitoring (YES at W64), the EMS 10 sets a state of a flag corresponding to the ID of the femto base station determined as having the power disconnection or the cable disconnection to "disabled" among the monitoring enabled flags in the individual information T111b of the group information table T111 (W65). Therefore, the femto base station determined as having the power disconnection or the cable disconnection is deleted from the monitoring femto matrix list L1.

At this time, if a femto group to be monitored is not registered, the EMS 10 registers the ID of the femto group in the periodic-monitoring-instruction regeneration management table T16 (W66).

As a result of the determination at W64, if the value of the timestamp is not equal to that of the previous periodic monitoring (NO at W64), the EMS 10 resets the retry number m to the initial value such that m=1 (W67), and updates the value of the timestamp with the latest time (W68).

As a result of the determination at W63, if m M (NO at W63), the EMS 10 increments the retry number m by one such that m=m+1 (W69). Thereafter, the process proceeds to W68.

As a result of the determination at W62, if a result of the connection check is "connected (normal reply)" (NO at W62), it is possible to determine that the fault suspected femto base station F1 is in a state just after the power is turned on. Therefore, the EMS 10 deletes the value of the timestamp (W70), and initializes the retry number m such that m=0 (W71).

Figure 23:
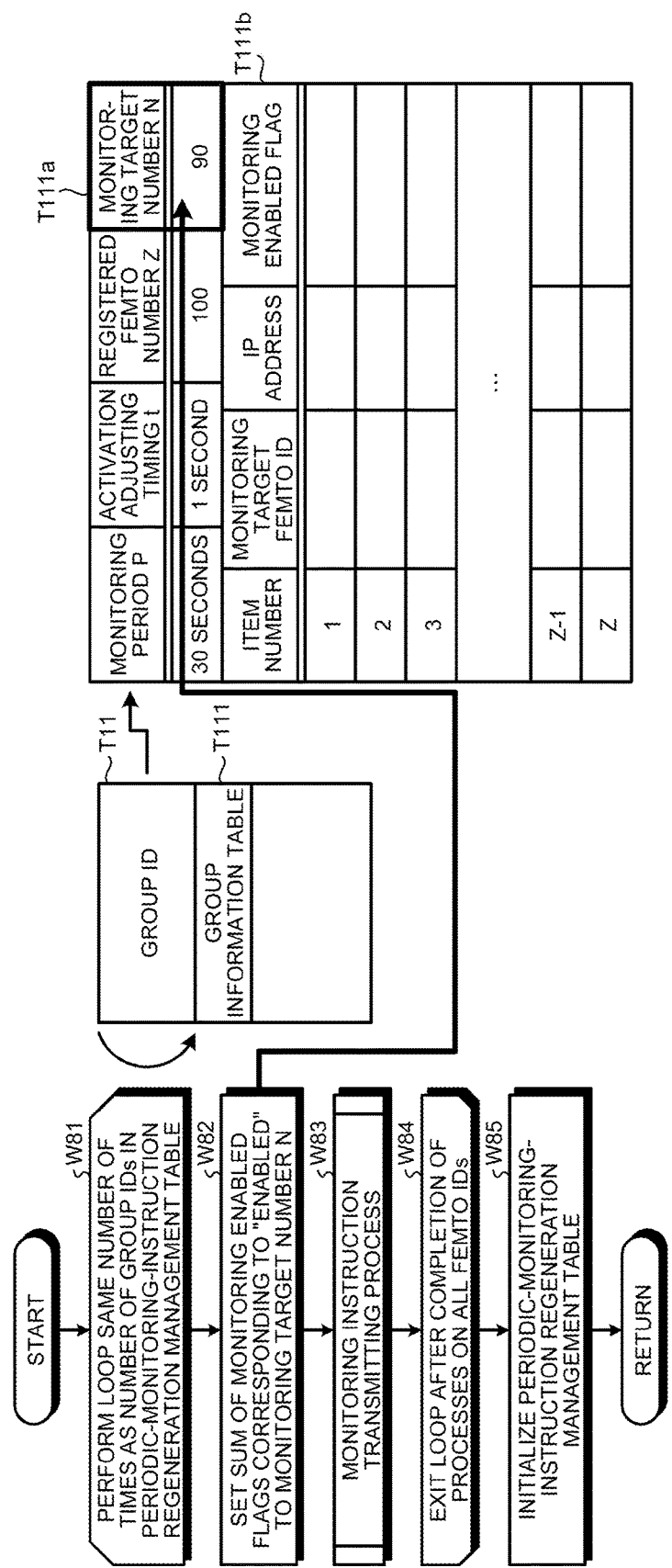
FIG. 23 is a flowchart for explaining a monitoring instruction regenerating process performed by the EMS.

FIG. 23 is a flowchart for explaining the monitoring instruction regenerating process performed by the EMS 10. At W81, the EMS 10 starts a process (loop) to repeat processes at W82 and W83, which will be described later, the same number of times as the number of the group IDs registered in the periodic-monitoring-instruction regeneration management table T16. At W82, the EMS 10 calculates a sum of the monitoring enabled flags corresponding to "enabled" in the individual information T111$b$ in the group information table T111, and sets the sum in the monitoring target number N in the common information T111$a$. Subsequently, the EMS 10 performs the monitoring instruction transmitting process as described above (see FIG. 12) (W83). The EMS 10, upon completing the processes at W82 and W83 on all of the group IDs registered in the periodic-monitoring-instruction regeneration management table T16, exits the loop, and performs a process at W85 to be described below (W84). At W85, the EMS 10 initializes the periodic-monitoring-instruction regeneration management table T16 (see FIG. 18).

As described above, the periodic monitoring system 1 according to the embodiment includes a plurality of the femto base stations F1 to F100 and the EMS 10 that monitors the femto base stations F1 to F100. The EMS 10 includes the monitoring instruction transmitting unit 12, the abnormality report receiving unit 13, and the fault analyzing unit 15. The monitoring instruction transmitting unit 12 transmits, to the femto base stations F1 to F100, instructions for mutual monitoring among the femto base stations F1 to F100. The abnormality report receiving unit 13 receives information (for example, the abnormality report message) indicating the femto base station F5 determined as having abnormality, from the femto base station F1 that has detected the abnormality (for example, a connection failure) in accordance with the instruction among the femto base stations F1 to F100. The fault analyzing unit 15 determines a level of the fault that has occurred in the femto base station F5 indicated by the information received by the abnormality report receiving unit 13. The femto base stations F1 to F100 include the monitoring instruction receiving units F1-1 to F100-1, the periodic monitoring units F1-2 to F100-2, and the abnormality report transmitting units F1-3 to F100-3, respectively. The monitoring instruction receiving units F1-1 to F100-1 receive the instructions transmitted by the EMS 10. The periodic monitoring units F1-2 to F100-2 monitor the other femto base stations F1 to F100 in accordance with the instructions. The abnormality report transmitting units F1-3 to F100-3, upon detecting abnormality in the other femto base stations F1 to F100 being monitored as a result of the monitoring, transmits information indicating the femto base station F5 determined as having the abnormality to the EMS 10.

According to the periodic monitoring system 1 of the embodiment, the femto base stations F1 to F100 mutually monitor the femto base stations F1 to F100 in accordance with the instructions from the EMS 10. Therefore, the monitoring load concentrated in the EMS 10 is distributed to the femto base stations F1 to F100. Consequently, the monitoring load on the EMS 10 can be reduced.

Further, the EMS 10 may further include the histogram generating unit 14 that generates a histogram of the number of abnormality reports within a predetermined monitoring period by using the information received by the abnormality report receiving unit 13. The fault analyzing unit 15 may determine the level of the fault based on the distribution ratio of the histogram generated by the histogram generating unit 14. Consequently, the EMS 10 can determine not only the presence or absence of each of the femto base stations F1 to F100 but also the type of a fault (for example, an intermittent fault, a permanent fault, or a power disconnection) with accuracy.

Further, the above described instructions may include the monitoring femto matrix list L1 and the monitoring period of the femto base stations to be monitored by the femto base stations F1 to F100. Consequently, the EMS 10 can comprehensively recognize the presence or absence of a fault and the level of a fault within the predetermined monitoring period with respect to all of the femto base stations F1 to F100 belonging to a predetermined group, for example.

Furthermore, the above described information may include the identification information and the IP address of the femto base station determined as having abnormality. Consequently, the EMS 10 can easily and promptly detect an attribute or a position of the femto base station that is estimated as having the fault.

The components of the EMS 10 need not necessarily be physically configured in the manner illustrated in the drawings. In other words, specific forms of disintegration and integration of the apparatuses are not limited to those illustrated in the drawings, and all or part of the apparatuses may be functionally or physically disintegrated or integrated in arbitrary units depending on various loads or use conditions. For example, the monitoring instruction transmitting unit 12 and the abnormality report receiving unit 13 may be integrated into a single component, or the histogram generating unit 14 and the fault analyzing unit 15 may be integrated into a single component. Conversely, the fault analyzing unit 15 may be disintegrated into a part that performs the primary analysis process, a part that performs the secondary analysis process, and a part that performs the power disconnection suspicion analyzing process. Further, the monitoring instruction generating unit 11 may be disintegrated into a part that generates the periodic femto monitoring instruction, and a part that performs the monitoring instruction regenerating process. Furthermore, the memory 10$c$ may be configured as an external apparatus of the EMS 10 so as to be connectable via a cable or a network.

According to an aspect of the monitoring device disclosed in the present application, it is possible to reduce monitoring load.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring device comprising:
a processor that executes a process including:
transmitting to a plurality of base stations, instructions on mutual monitoring among the base stations;
receiving from a base station that has detected abnormality of a base station serving as a monitoring target in accordance with the instruction among the base stations, information indicating a base station determined as having abnormality; and
determining a level of a fault that has occurred in the base station indicated by the information received at the receiving, wherein
the instructions include a list of base stations to be monitored by the base stations and a monitoring period,
the list registers the base stations to be monitored such that the base stations to be monitored slightly differ for each of the base stations that perform monitoring, and
the list is designed such that all of the base stations have equal monitoring load in an entire monitoring system.

2. The monitoring device according to claim 1, wherein
the process further includes generating a histogram of number of abnormality reports within a predetermined monitoring period by using the information received at the receiving, and
the determining includes determining the level of the fault based on a distribution ratio of the histogram generated at the generating.

3. The monitoring device according to claim 1, wherein the information includes identification information and an internet protocol (IP) address of the base station determined as having the abnormality.

4. A monitoring system that includes a plurality of base stations and a monitoring device that monitors the base stations, wherein
the monitoring device includes:
a first processor that executes a first process including:
first transmitting, to the base stations, instructions on mutual monitoring among the base stations;
first receiving, from a base station that has detected abnormality of a base station serving as a monitoring target in accordance with the instruction among the base stations, information indicating a base station determined as having abnormality; and
determining a level of a fault that has occurred in the base station indicated by the information received at the first receiving, and
each of the base stations includes:
a second processor that executes a second process including:
second receiving the instruction transmitted by the monitoring device;
monitoring the other base stations in accordance with the instruction; and
second transmitting, upon detection of abnormality in any of the other base station as a result of the monitoring, information indicating the base station determined as having abnormality to the monitoring device wherein
the instructions include a list of base stations to be monitored by the base stations and a monitoring period,
the list registers the base stations to be monitored such that the base stations to be monitored slightly differ for each of the base stations that perform monitoring, and
the list is designed such that all of the base stations have equal monitoring load in an entire monitoring system.

* * * * *